US010442940B2

(12) United States Patent
Loccufier et al.

(10) Patent No.: US 10,442,940 B2
(45) Date of Patent: *Oct. 15, 2019

(54) RADIATION CURABLE COMPOSITIONS FOR FOOD PACKAGING

(71) Applicant: AGFA NV, Mortsel (BE)

(72) Inventors: Johan Loccufier, Mortsel (BE); Roel De Mondt, Mortsel (BE)

(73) Assignee: AGFA NV, Mortsel (BE)

( * ) Notice: Subject to any disclaimer, the term of this patent is extended or adjusted under 35 U.S.C. 154(b) by 127 days.

This patent is subject to a terminal disclaimer.

(21) Appl. No.: 14/912,931

(22) PCT Filed: Sep. 16, 2014

(86) PCT No.: PCT/EP2014/069679
§ 371 (c)(1),
(2) Date: Feb. 19, 2016

(87) PCT Pub. No.: WO2015/036607
PCT Pub. Date: Mar. 19, 2015

(65) Prior Publication Data
US 2016/0200923 A1 Jul. 14, 2016

(30) Foreign Application Priority Data

Sep. 16, 2013 (EP) .................................. 13184521

(51) Int. Cl.
| | | |
|---|---|---|
| *C09D 11/101* | (2014.01) | |
| *B41J 2/01* | (2006.01) | |
| *C08F 2/50* | (2006.01) | |
| *C09D 11/10* | (2014.01) | |
| *C09D 11/00* | (2014.01) | |
| *C09D 11/40* | (2014.01) | |
| *B65D 65/42* | (2006.01) | |
| *B41J 2/21* | (2006.01) | |
| *B41J 11/00* | (2006.01) | |
| *C09D 11/322* | (2014.01) | |
| *C09D 11/30* | (2014.01) | |
| *C09D 11/107* | (2014.01) | |
| *B41M 5/00* | (2006.01) | |

(52) U.S. Cl.
CPC .............. *C09D 11/101* (2013.01); *B41J 2/01* (2013.01); *B41J 2/2107* (2013.01); *B41J 11/00* (2013.01); *B41J 11/002* (2013.01); *B65D 65/42* (2013.01); *C09D 11/30* (2013.01); *C09D 11/322* (2013.01); *C09D 11/40* (2013.01); *B41M 5/0023* (2013.01); *C08F 2/50* (2013.01); *C09D 11/107* (2013.01)

(58) Field of Classification Search
CPC ....... C09D 11/101; C09D 11/30; C09D 11/40; C09D 11/322; C09D 11/107; B41J 11/002; B41J 2/01; B65D 65/42; B41M 5/0023; C08F 2/50
See application file for complete search history.

(56) References Cited

U.S. PATENT DOCUMENTS

| | | | | |
|---|---|---|---|---|
| 9,056,986 | B2 * | 6/2015 | Kagose | .................... C09D 4/00 |
| 9,090,787 | B2 * | 7/2015 | Yoda | .................... C09D 11/101 |
| 2014/0285568 | A1 * | 9/2014 | Loccufier | ............. C09D 11/101 |
| | | | | 347/20 |

FOREIGN PATENT DOCUMENTS

| | | | | |
|---|---|---|---|---|
| EP | 1911814 A1 * | 4/2008 | ............. | C09D 11/00 |
| EP | 2 033 949 A1 | 3/2009 | | |
| EP | 2 053 101 A1 | 4/2009 | | |
| EP | 2 161 290 A1 | 3/2010 | | |
| EP | 2 199 273 A1 | 6/2010 | | |
| EP | 2 444 429 A1 | 4/2012 | | |
| EP | 2 604 663 A1 | 6/2013 | | |
| WO | 2008/074759 A1 | 6/2008 | | |
| WO | 2009/147057 A1 | 12/2009 | | |

OTHER PUBLICATIONS

Official Communication issued in International Patent Application No. PCT/EP2014/069679, dated Dec. 15, 2014.
Loccufier et al., "Radiation Curable Compositions for Food Packaging," U.S. Appl. No. 14/912,932, filed Feb. 19, 2016.
De Mondt et al., "Radiation Curable Compositions for Food Packaging," U.S. Appl. No. 14/912,933, filed Feb. 19, 2016.

\* cited by examiner

*Primary Examiner* — Jessica M Roswell
(74) *Attorney, Agent, or Firm* — Keating and Bennett, LLP

(57) ABSTRACT

A radiation curable inkjet ink set containing a plurality of inkjet inks having a viscosity of no more than 50 mPa·s at 25° C. and a shear rate of 90 s-1, each of the inkjet inks including a) at least one non-polymerizable, non-polymeric bisacylphosphine oxide present in a concentration of no more than 4.0 wt % based on the total weight of the inkjet ink; b) at least one monomer including at least one vinyl ether group and at least one polymerizable group selected from the group consisting of an acrylate group and a methacrylate group; and c) at least one polymerizable or polymeric thioxanthone, with the proviso that if the at least one polymerizable or polymeric thioxanthone contains no tertiary amine group, then the inkjet ink further includes at least one tertiary amine co-initiator selected from the group consisting of ethylhexyl-4-dimethylaminobenzoate and a polymerizable co-initiator containing a tertiary amine.

14 Claims, No Drawings

RADIATION CURABLE COMPOSITIONS FOR FOOD PACKAGING

CROSS-REFERENCE TO RELATED APPLICATIONS

This application is a 371 National Stage Application of PCT/EP2014/069679, filed Sep. 16, 2014. This application claims the benefit of European Application No. 13184521.6, filed Sep. 16, 2013, which is incorporated by reference herein in its entirety.

BACKGROUND OF THE INVENTION

1. Field of the Invention

The present invention relates to a radiation curable composition for packaging printing, more specifically for high speed digital food packaging printing.

2. Description of the Related Art

Printing systems, such as offset and flexography, are being increasingly replaced for packaging applications by industrial inkjet printing systems due to their flexibility in use, e.g. variable data printing allowing last minute advertising changes on the packaging, and due to their enhanced reliability, allowing their incorporation into production lines. Radiation curable inkjet inks are particularly preferred because high quality images can be printed on non-absorbing ink-receivers, such as plastic packaging materials.

High reliability of inkjet printing on food packaging is not only required for reasons of productivity in an industrial environment, but also for reasons of food safety. The European Printing Ink Association (EuPIA) provides GMP guidelines for food packaging printing inks. In Europe most of the attention today is going to the Swiss legislation ("Ordinance on Materials and Articles in Contact with Food", SR 817.023.21), promulgating a positive list of compounds. The US Food and Drug Administration (FDA) adheres to the no-migration principle and, therefore, does not impose specific guidelines on inks, except for direct food contact. A key figure in the allowable level of migration and/or set-off for ink compounds is 10 µg/6 dm$^2$ (6 dm$^2$ is the typical surface area of packaging material for 1 kg of food) per ink compound. This ratio of 10 µg/1 kg of food is also described as 10 ppb and is the rule-of-thumb for the allowable migration limit for an ink compound in the majority of legislations, but this limit can be higher, when substantiated by sufficient toxicological data.

Suitable UV curable inkjet inks for primary food packaging applications, often referred to as Low Migration (LM) inks, are exemplified by EP 2053101 A (AGFA), EP 2199273 A (AGFA) and EP 2161290 A (AGFA).

However, low migration UV curable inkjet inks as such do not exist. An ink formulation for printing on the outside of primary packaging can only contribute to safe food packaging. Also the packaging material and all conditions of the printing process should be monitored by migration testing. For example, phthalate plasticizers in packaging materials have attracted a lot of attention in the past and more recent reports involved the contamination of corn flakes by mineral oils from printing inks contained in recycled paper and carton.

From an engineering point of view, incorporating LED curing in manufacturing lines is considerably more convenient in comparison with classical mercury UV lamps and also reduces overall energy consumption. The evolution for curing UV curable inkjet inks from broad, high power mercury UV lamps to UV LEDs emitting in a narrow band at smaller UV light output has made low migration UV curable inkjet printing packaging solutions even more critical for printing reliability and food safety. The smaller UV light output of UV LEDs can be partly compensated by using a nitrogen blanket during curing. However in production lines, inertisation by using a nitrogen blanket complicates the design of the production line to such an extent that implementing digital printing into a production line is no longer economically feasible.

In addition, improper storage and transport conditions may also deteriorate the performance of UV curable LM inkjet inks. Not only the dispersion stability of colour pigments in the ink may be negatively impacted, but also curing speed may be reduced while migrateables can increase.

Hence, there is still a need for improved radiation curable inkjet inks which can be printed with high reliability, which can be cured by UV LEDs and which do not suffer under varying transport conditions of freezing temperatures and high temperatures.

SUMMARY OF THE INVENTION

In order to overcome the problems described above, preferred embodiments of the present invention have been realised with a radiation curable inkjet ink set as defined below.

It was surprisingly found that a non-polymerizable, non-polymeric bisacylphosphine oxide could be used to provide a radiation curable composition for industrial food packaging printing having a high LED sensitivity without the need for inertisation, while still achieving the food safety requirements of the Swiss Ordinance legislation. By controlling the concentration of the non-polymerizable, non-polymeric bisacylphosphine oxide to an upper limit, the influence of varying storage and transport conditions on the performance of the radiation curable composition was minimized. The advantages could only be accomplished using a specific combination of a polymerizable or polymeric thioxanthone; a specific co-initiator containing a tertiary amine; and a vinylether (meth)acrylate monomer.

The radiation curable inkjet ink set according to preferred embodiments of the invention is preferably used for inkjet printing an image on food packaging, more preferably used for inkjet printing wherein the image is at least partially cured by one or more UV LEDs.

Further advantages and benefits of the invention will become apparent from the description hereinafter.

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —$NO_2$.

The term "image" includes text, numbers, graphics, logos, photos, barcodes, QR codes, and the like. An image can be defined in 1 or more colours.

Radiation Curable Compositions

The radiation curable composition has a viscosity of no more than 50 mPa·s at 25° C. and a shear rate of 90 $s^{-1}$ and contains: a) at least one non-polymerizable, non-polymeric bisacylphosphine oxide present in a concentration of no more than 4.0 wt % based on the total weight of the radiation curable composition; b) at least one monomer comprising at least one vinyl ether group and at least one polymerizable group selected from the group consisting of an acrylate group and a methacrylate group; and c) at least one polymerizable or polymeric thioxanthone, with the proviso that if the at least one polymerizable or polymeric thioxanthone contains no tertiary amine group that the radiation curable composition further includes at least one tertiary amine co-initiator selected from the group consisting of ethylhexyl-4-dimethylaminobenzoate, a polymerizable co-initiator containing a tertiary amine and a polymeric co-initiator containing a tertiary amine.

The radiation curable composition is preferably curable by UV radiation.

The radiation curable composition is preferably jettable by an inkjet printing device, more preferably an inkjet printing device employing UV curing instead of electron beam curing.

The radiation curable composition may be a hybrid UV curable composition, i.e. curable by cationic and free radical polymerization, but preferably the radiation curable composition is a free radical UV curable composition. It was found in industrial inkjet printing systems that cationically curable inkjet inks posed problems of jetting reliability due to UV stray light. UV stray light hitting the nozzle plate of an inkjet print head results into failing nozzles due to clogging by cured ink in the nozzle. Unlike free radical curable ink where radical species have a much shorter lifetime, a cationic curable ink continues to cure once an acid species has been generated by UV light in the nozzle.

The at least one non-polymerizable, non-polymeric bisacylphosphine oxide is preferably selected from the group consisting of bis(2,4,6-trimethylbenzoyl)phenylphosphine oxide and bis(2,6-dimethoxybenzoyl)(2,4,4-trimethylpentyl)phosphine oxide.

Suitable bis(acyl)phosphine oxide photoinitiators are also disclosed by WO 2012/012067 (DSM).

The at least one non-polymerizable, non-polymeric bisacylphosphine oxide must be present in a concentration of no more than 4.0 wt % based on the total weight of the radiation curable composition, preferably in an amount of 1.0 to 3.5 wt % based on the total weight of the radiation curable composition. Amounts smaller than 1.0 wt % negatively affect the curing speed by UV LEDs. An amount larger than 4.0 wt % results in inconsistent performance of the radiation curable composition when exposed to varying storage and transport conditions.

The radiation curable composition may contain a colorant, in such a case the radiation curable composition is referred to as a UV curable inkjet ink. The colorant is preferably a colour pigment.

In a preferred embodiment, the radiation curable composition forms part of an inkjet ink set. It may be colourless and used as a varnish (e.g. top layer on packaging) and/or a primer (bottom layer, e.g. a barrier layer for migrateables). The primer may also have a white colour for masking defects in the packaging and enhancing the brilliance of colours printed thereon. The varnish may also have a white colour as it can then be used in reverse printing of packaging materials. In this case the transparent substrate becomes the outer layer of the packaging and the print is protected by the substrate. Contact between the print and the food is avoided by glueing an inner foil to the ink layer in a lamination process. The radiation curable composition is preferably a radiation curable inkjet ink. More preferably all the radiation curable inkjet inks of the inkjet ink set have a composition complying with the invention.

The radiation curable inkjet ink preferably contains a dispersant, more preferably a polymeric dispersant, for dispersing the colour pigment. The radiation curable inkjet ink may also contain a dispersion synergist to improve the dispersion quality and stability of the ink. A mixture of dispersion synergists may be used to further improve dispersion stability.

The surface tension of the radiation curable jettable composition or inkjet ink is preferably from 20 to 50 mN/m at 25° C., more preferably from 22 to 35 mN/m at 25° C. It is preferably 20 mN/m or more from the viewpoint of printability by a second radiation curable inkjet ink, and it is preferably not more than 35 mN/m from the viewpoint of the wettability.

For having a good ejecting ability, the viscosity of the radiation curable jettable composition or inkjet ink at the jetting temperature is preferably smaller than 30 mPa·s, more preferably smaller than 15 mPa·s, and most preferably between 4 and 13 mPa·s at a shear rate of 90 $s^{-1}$ and a jetting temperature between 10 and 70° C.

The viscosity of radiation curable composition or inkjet ink is preferably smaller than 35 mPa·s, preferably smaller than 28 mPa·s, and most preferably between 2 and 25 mPa·s at 25° C. and at a shear rate of 90 $s^{-1}$.

The radiation curable composition or inkjet ink may further also contain at least one inhibitor for improving the thermal stability of the composition or inkjet ink.

The radiation curable composition or inkjet ink may further also contain at least one surfactant for obtaining good spreading characteristics on a substrate.

The radiation curable composition or inkjet ink preferably includes 60 to 98 wt % of polymerizable compounds, more preferably 70 to 90 wt % of polymerizable compounds based upon the total weight of the radiation curable composition or inkjet ink.

Inkjet Ink Sets

The radiation curable composition or inkjet ink is part of a radiation curable inkjet ink set including a plurality of inkjet inks. The radiation curable inkjet ink set preferably includes at least a cyan radiation curable inkjet ink, a magenta radiation curable inkjet ink, a yellow radiation curable inkjet ink and a black radiation curable inkjet ink.

The curable CMYK-inkjet ink set may also be extended with extra inks such as red, green, blue, and/or orange to further enlarge the colour gamut of the image. The radiation curable inkjet ink set may also be extended by the combination of the full density inkjet inks with light density inkjet inks. The combination of dark and light colour inks and/or black and grey inks improves the image quality by a lowered graininess.

The curable ink set may also include one or more spot colours, preferably one or more corporate colours, such as e.g. the red colour of CocaCola™.

The curable inkjet ink set may also include a varnish. The curable inkjet ink set preferably also includes a white inkjet ink.

The radiation curable inkjet ink set is preferably a free radical curable inkjet ink set.

Polymerizable and Polymeric Thioxanthone Photoinitiators

The radiation curable composition contains at least one polymerizable or polymeric thioxanthone, preferably in an amount of 2 to 20 wt %, more preferably 3 to 17 wt %, and most preferably 5 to 15 wt % wherein the weight percentage (wt %) is based on the total weight of the radiation curable composition.

The radiation curable composition preferably contains at least one polymerizable or polymeric thioxanthone having a tertiary amine group in its chemical structure. The tertiary amine group can then act as a co-initiator molecule for another molecule of the at least one polymerizable or polymeric thioxanthone. If the position of the tertiary amine group in the at least one polymerizable or polymeric thioxanthone is well-chosen not only intermolecular co-initiation but also intra-molecular co-initiation is possible.

A preferred polymerizable thioxanthone photoinitiator containing a tertiary amine group is represented by a compound according to Formula (TN-1):

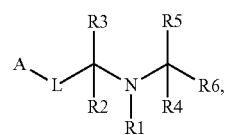

Formula (TN-1)

wherein: A represents a thioxanthone group; L represents a divalent linking group containing 1 to 15 carbon atoms positioning the thioxanthone initiating group A and the CR2R3-group in a 1-5 to a 1-8 position wherein position 1 is defined as the first atom in the aromatic or alicyclic ring of A to which L is covalently bonded and the position 5 to 8 is defined as the carbon atom of the CR2R3-group to which L is covalently bonded, with the proviso that L does not contain an amine; R1 represents an optionally substituted group selected from the group consisting of an alkyl group, an alkenyl group, an alkynyl group, an aralkyl group, an alkaryl group, an aryl group and a heteroaryl group; R2 to R6 each independently represent a hydrogen or an optionally substituted group selected from the group consisting of an alkyl group, an alkenyl group, an alkynyl group, an aralkyl group, an alkaryl group, an aryl group and a heteroaryl group, with the proviso that at least one of R2 to R6 represents a hydrogen; any two or three groups of the group selected from R1 to R6 and L may represent the necessary atoms to form a five to eight membered ring; and with the proviso that at least one of L, R1 to R6 and A is substituted with at least one ethylenically unsaturated polymerizable group selected from the group consisting of an acrylate group, a methacrylate group, an acrylamide group, a methacrylamide group, a styrene group, a vinyl ether group, an allyl ether group, an allyl ester group, a vinyl ester group, a succinate group, a maleate group, and a maleimide group.

Preferred examples of polymerizable thioxanthone photoinitiators containing a tertiary amine group are given in Table 1 below without being limited thereto.

TABLE 1

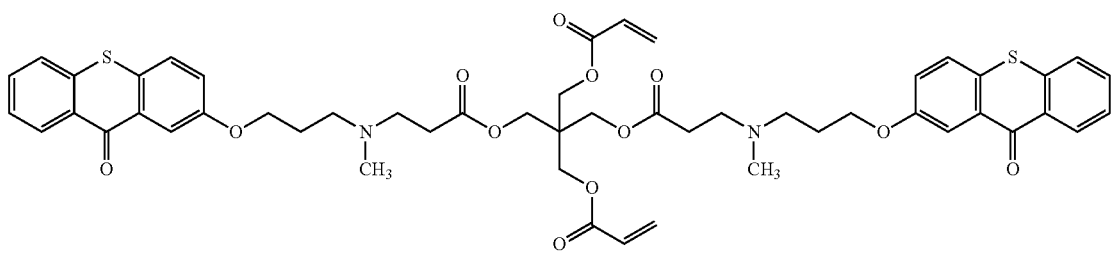 [SMILES: C=CC(=O)OCC(COC(=O)C=C)(COC(=O)CCN(C)CCCOc1ccc2sc3ccccc3c(=O)c2c1)COC(=O)CCN(C)CCCOc1ccc2sc3ccccc3c(=O)c2c1]

TN-1a

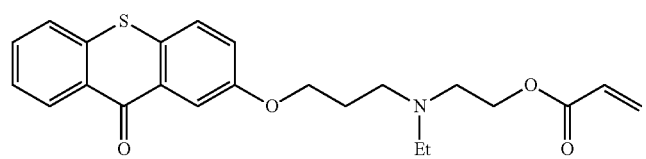 [SMILES: C=CC(=O)OCCN(CC)CCCOc1ccc2sc3ccccc3c(=O)c2c1]

TN-1b

TABLE 1-continued
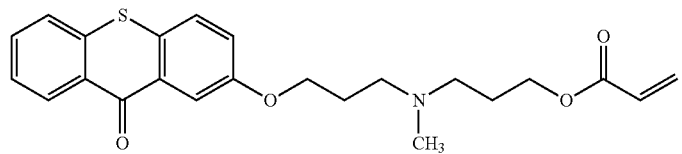 [SMILES: C=CC(=O)OCCCN(C)CCCOc1ccc2sc3ccccc3c(=O)c2c1]
TN-1c
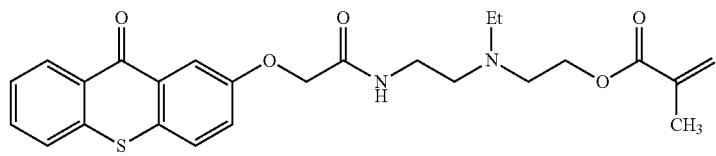 [SMILES: C=C(C)C(=O)OCCN(CC)CCNC(=O)COc1ccc2sc3ccccc3c(=O)c2c1]
TN-1d
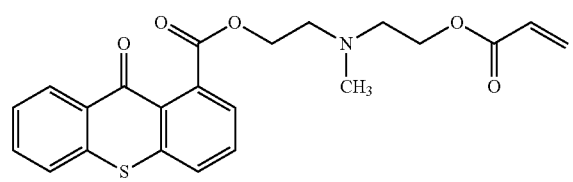 [SMILES: C=CC(=O)OCCN(C)CCOC(=O)c1cccc2sc3ccccc3c(=O)c12]
TN-1e
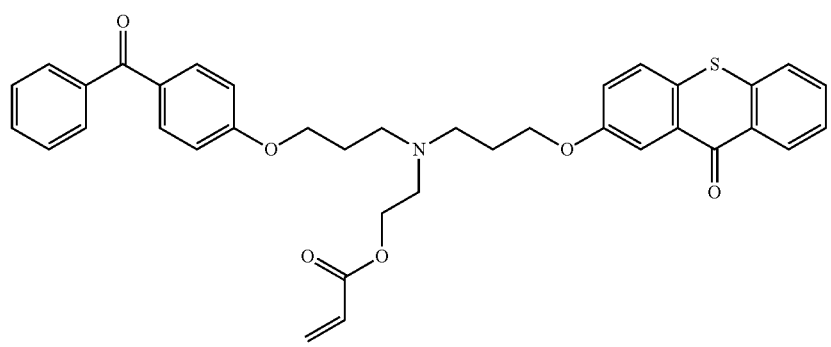 [SMILES: C=CC(=O)OCCN(CCCOc1ccc(C(=O)c2ccccc2)cc1)CCCOc1ccc2sc3ccccc3c(=O)c2c1]
TN-1f
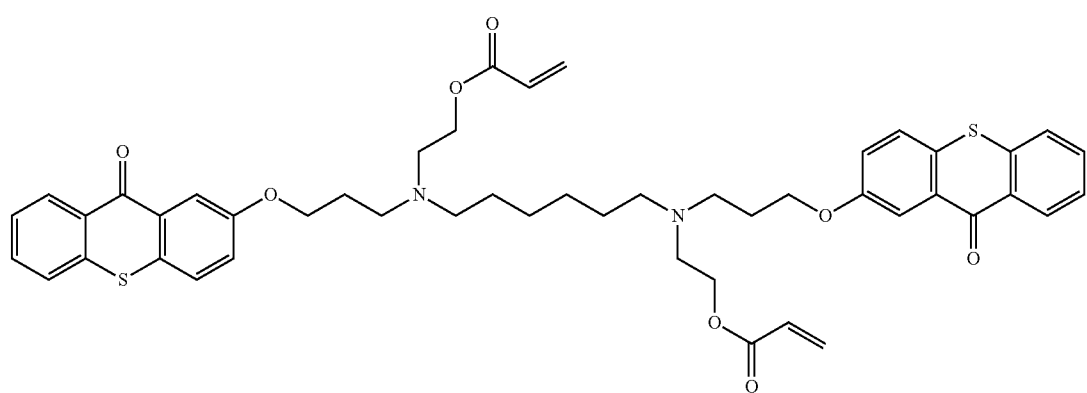 [SMILES: C=CC(=O)OCCN(CCCCCCN(CCCOc1ccc2sc3ccccc3c(=O)c2c1)CCOC(=O)C=C)CCCOc1ccc2sc3ccccc3c(=O)c2c1]
TN-1g
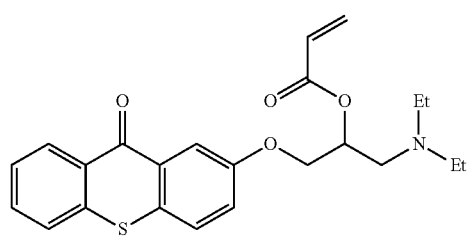 [SMILES: C=CC(=O)OC(COc1ccc2sc3ccccc3c(=O)c2c1)CN(CC)CC]
TN-1h A preferred polymeric thioxanthone photoinitiator containing a tertiary amine group is represented by a compound according to Formula (TN-2):

  Formula (TN-2), wherein X represents a structural moiety according to Formula (TXA):

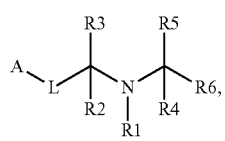 Formula (TXA)

wherein: A represents a thioxanthone group; L represents a divalent linking group containing 1 to 15 carbon atoms positioning the thioxanthone group A and the CR2R3-group in a 1-5 to a 1-9 position wherein position 1 is defined as the first atom in the aromatic or alicyclic ring of A to which L is covalently bonded and the position 5 to 9 is defined as the carbon atom of the CR2R3-group to which L is covalently bonded, with the proviso that L does not contain an amine; R1 represents an optionally substituted group selected from the group consisting of an alkyl group, an alkenyl group, an alkynyl group, an aralkyl group, an alkaryl group, an aryl group and a heteroaryl group; R2 to R6 each independently represent a hydrogen or an optionally substituted group selected from the group consisting of an alkyl group, an alkenyl group, an alkynyl group, an aralkyl group, an alkaryl group, an aryl group and a heteroaryl group, with the proviso that at least one of R2 to R6 represents a hydrogen;

any two or three groups of the group selected from R1 to R6 and L may represent the necessary atoms to form a five to eight membered ring; and with the proviso that L is not substituted with a (meth)acrylate group and that none of R1 to R6 is substituted with an ethylenically unsaturated polymerizable group; Q represents a n-valent linking group having a number average molecular weight of at most 10000; Q is bonded to each of the moieties X via a single bond to a group selected from R1 to R6, L and A; and n represents an integer from 2 to 8.

Preferred examples of polymeric thioxanthone photoinitiators containing a tertiary amine group are given in Table 2 below without being limited thereto.

TABLE 2

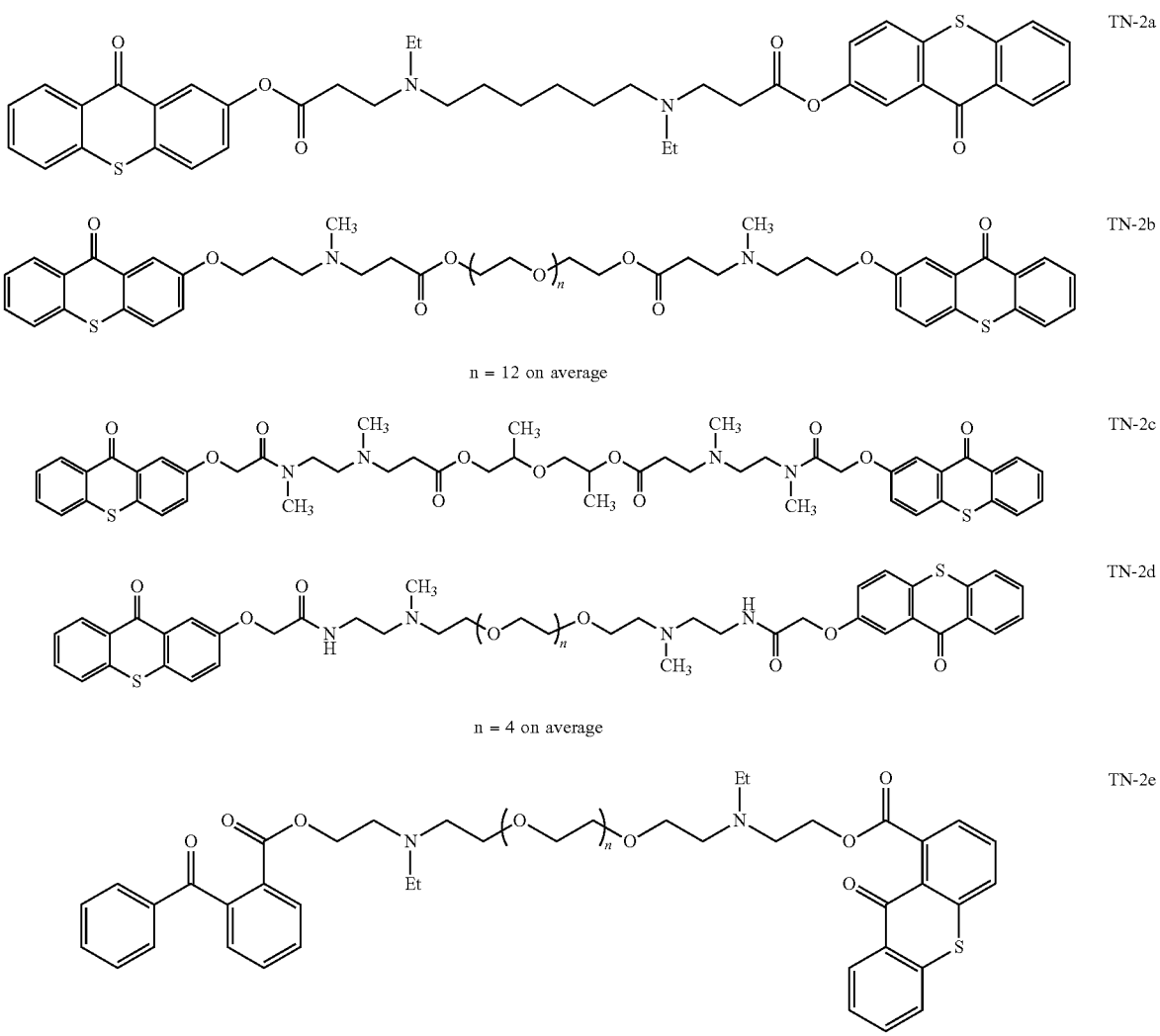

TABLE 2-continued

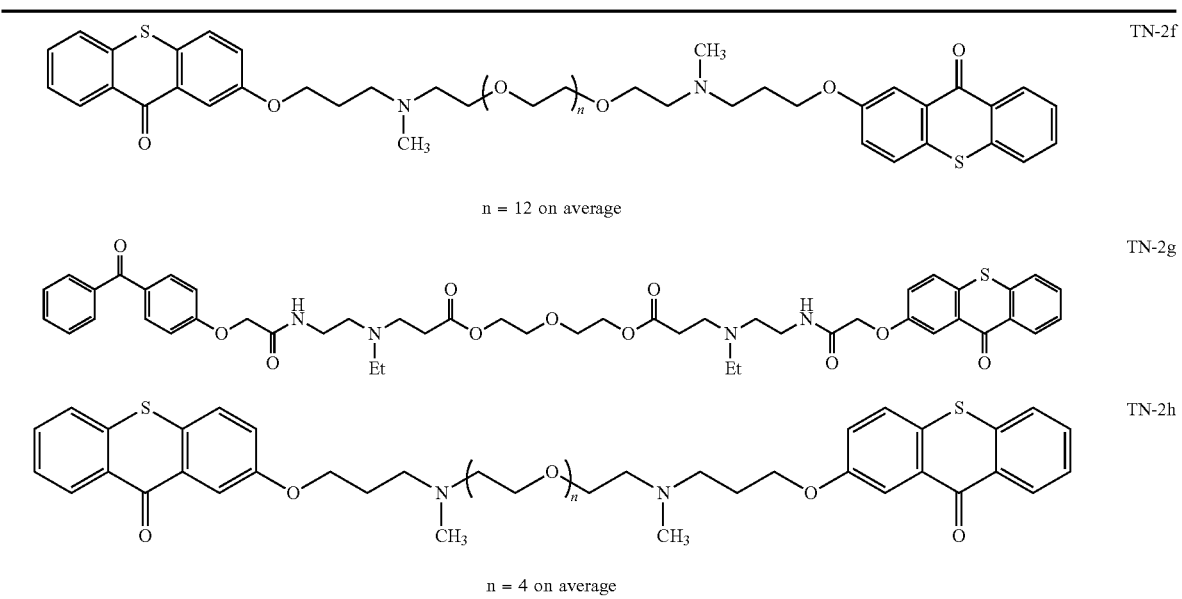

The radiation curable composition is preferably a polymerizable thioxanthone, more preferably a polymerizable thioxanthone having a structure according to Formula (I):

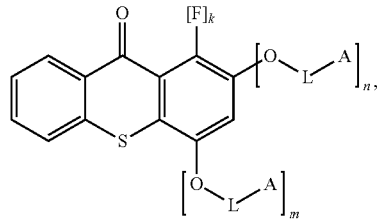

Formula (I)

wherein:
k is an integer having a value of 0 or 1;
n and m represents an integer having a value of 0 or 1, with the proviso that at least one of n an m should have a value of 1;
L represents a divalent linking group coupling A to the thioxanthone ring via an ether bond; and
A represents a structural moiety comprising 1 to 6 free radical polymerizable ethylenically unsaturated bonds.

L preferably contains 1 to 10 carbon atoms, more preferably 2 to 6 carbon atoms and L is most preferably is selected from the group consisting of a substituted or unsubstituted alkylene group, a substituted or unsubstituted alkenylene group, a substituted or unsubstituted alkynylene group, an ether containing linking group, preferably containing 1 to 4 units selected from the group consisting of an ethylene oxide, a propylene oxide and a butylene oxide group, an amide containing linking group, and an ester containing linking group.

The free radical polymerizable ethylenically unsaturated bonds in the polymerizable thioxanthone of Formula (I) are preferably selected from the group consisting of an acrylate group, a methacrylate group, a styrene group, an acryl amide group, a methacryl amide group, a maleate group, a fumarate group, a itaconate group, a vinyl ether group, an allyl ether group, a vinyl ester group and an allyl ester group. In a more preferred embodiment at least one of the 1 to 6 free radical polymerizable ethylenically unsaturated bonds represents an acrylate group or a methacrylate group, an acrylate being most preferred for reasons of food safety.

The polymerizable thioxanthone of Formula (I), preferably includes 2, 3 or 4 free radical polymerizable ethylenically unsaturated bonds. A too high number of free radical polymerizable ethylenically unsaturated bonds may result, especially in the case of acrylate groups, in early vitrification of the cured layer. Having more than one free radical polymerizable ethylenically unsaturated bond minimizes the amount of migrateables.

In a more preferred embodiment of the polymerizable thioxanthone, the polymerizable thioxanthone is represented by Formula (II):

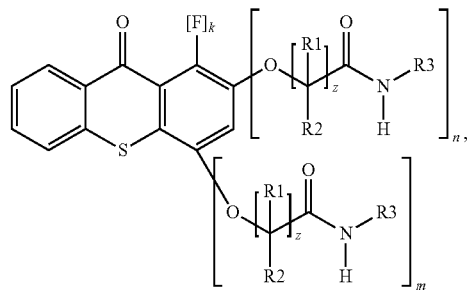

Formula (II)

wherein:
k is an integer having a value of 0 or 1;
n and m represents an integer having a value of 0 or 1, with the proviso that at least one of n an m should have a value of 1;
$R^1$ and $R^2$ are independently selected from the group consisting of a hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group;

z represents 1 or 2;

$R^3$ represents a moiety comprising at least one free radical polymerizable group selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a preferred embodiment, $R^3$ represents a moiety comprising 1 to 6 acrylate groups or methacrylate groups, the acrylate group being most preferred. Most preferably $R^3$ represents a moiety comprising 2, 3 or 4 acrylate groups for reasons of maximizing food safety.

In a preferred embodiment of the polymerizable thioxanthone according to Formula (I) or (II), the integers k and m have a value of 1, while the integer n has a value of 0.

In another preferred embodiment of the polymerizable thioxanthone according to Formula (I) or (II), the integers k and m have a value of 0, while the integer n has a value of 1.

The substituents $R^1$ and $R^2$ in the polymerizable thioxanthone according to Formula (I) or (II) preferably both represent hydrogen.

Other preferred polymerizable thioxanthones are disclosed in [0021] to [0031] and Table 1 of EP 2161264 A (AGFA), in [0029] to [0052] and Table 1 of WO 2010/069758 (AGFA) and in [0021] to [0031] and Table 1 of WO 2012/052288 (AGFA).

Particularly preferred polymerizable thioxanthones are selected from the group consisting of:

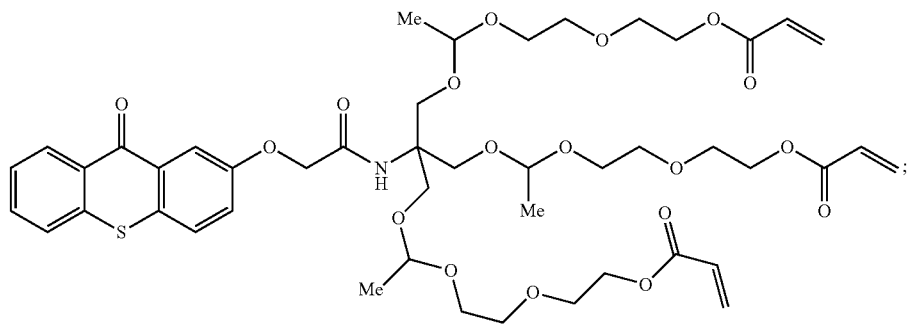

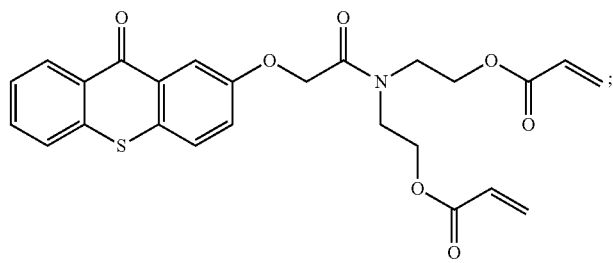

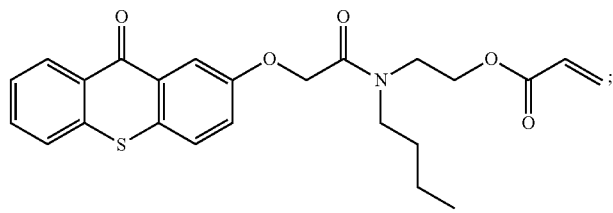

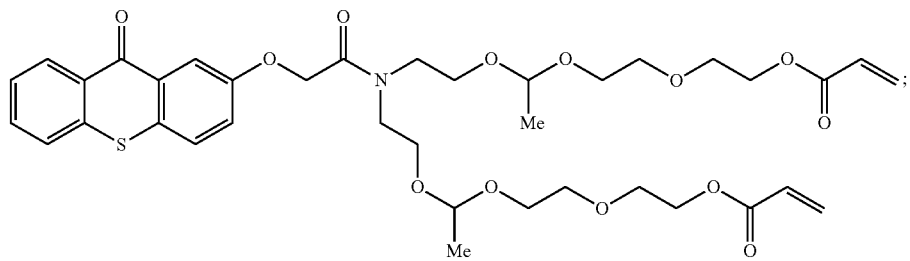

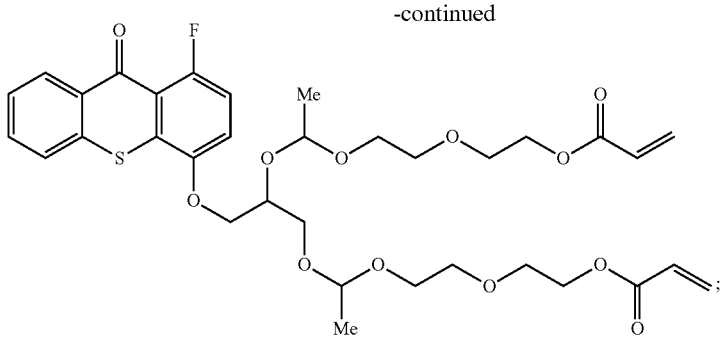

and
n-allylthioxanthone-3,4-dicarboximide.

If the radiation curable composition does not contain at least one polymerizable thioxanthone, its contains at least one polymeric thioxanthone. A combination of a polymerizable thioxanthone and polymeric thioxanthone can also be advantageously used in the radiation curable composition, for example to adjust the viscosity to a desired value.

For obtaining very low viscosities of the radiation curable composition, which is especially advantageous for radiation curable inkjet inks, the polymeric thioxanthone comprises a dendritic polymer core with at least one initiating functional group as an end group. Preferred examples are polymeric thioxanthones disclosed in [0064] to [0080] of EP 1616921 A (AGFA).

In a more preferred embodiment, the polymeric thioxanthone comprises a dendritic polymer core with at least one initiating functional group and at least one co-initiating functional group. Preferred examples are polymeric thioxanthones disclosed in [0061] to [0104] of EP 1616899 A (AGFA).

The dendritic polymeric core used in the polymeric thioxanthone for the radiation curable composition is preferably a hyperbranched polymer core.

Linear polymeric thioxanthones may be used and can be used to adjust the radiation curable composition to a higher viscosity.

Particularly preferred polymerizable thioxanthones are selected from the group consisting of:

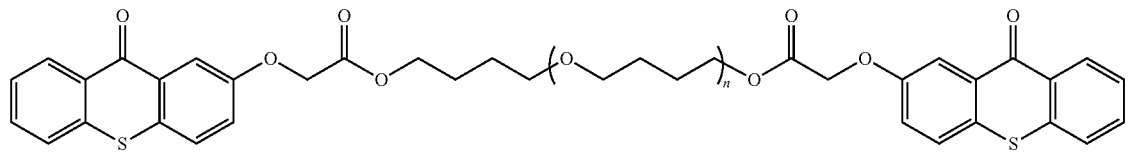

with n on average equal to 2 to 4; and

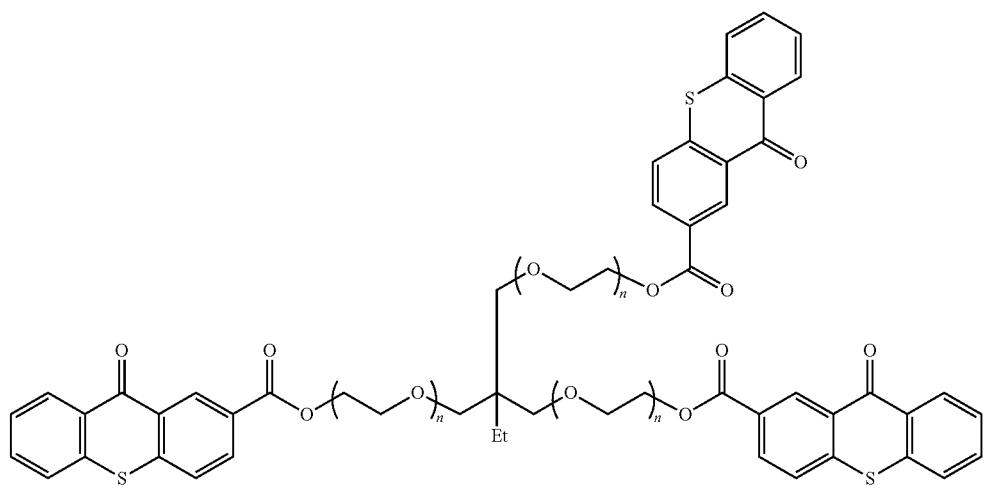

with a molecular weight Mw smaller than 1,000. Suitable commercially polymeric thioxanthones of the above compounds are available as Omnipol™ TX (CASRN515139-51-2) with n on average equal to 3 from IGM Resins, respectively Genopol™ TX-1 (CASRN1256447-30-9) having a Mw=820 from RAHN.

Other preferred polymeric thioxanthones are disclosed on pages 2 to 5 and the examples of WO 2009/060235 (LAMBSON) and in the last paragraph of page 1 to first paragraph of page 20 of WO 2010/124950 (SIEGWERK).

more 4-dialkylaminobenzoate groups, most preferably a polymerizable co-initiator containing one or more 4-dimethylaminobenzoate groups. Other preferred tertiary amine groups for the at least one polymerizable co-initiator containing a tertiary amine include aliphatic tertiary amine groups and piperazine groups.

In a particularly preferred embodiment, the polymerizable co-initiator containing a tertiary amine is selected from the group consisting of:

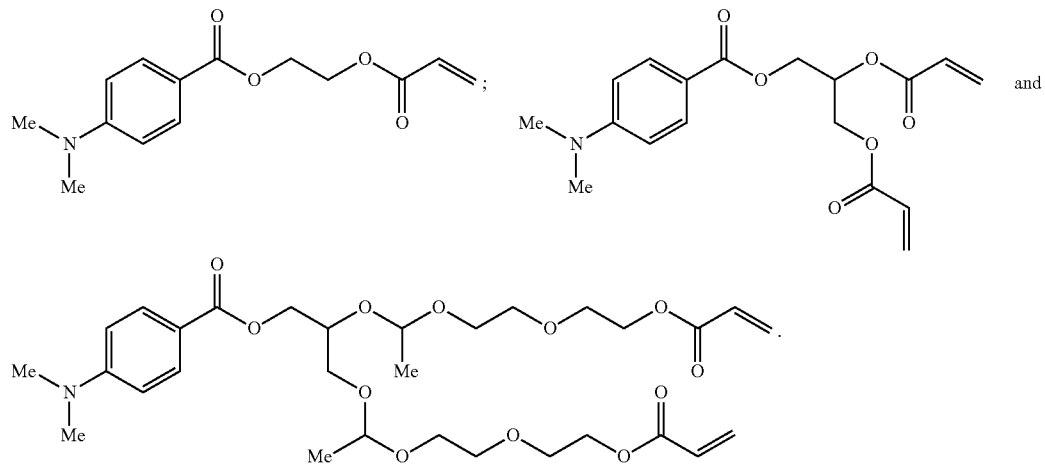

Suitable polymeric initiators have been recently reviewed by Hrdlovic P. (Polymer News, 30(6), 179-182 (2005) and Polymer News, 30(8), 248-250 (2005)) and Corrales T. (Journal of Photochemistry and Photobiology A: Chemistry 159 (2003), 103-114). Further suitable polymeric photoinitiators can be found in CRIVELLO, J. V., et al.; Chemistry & technology of UV & EB Formulation for Coatings, Inks & Paints. Volume III: Photoinitiators for Free Radical, Cationic & Anionic Photopolymerisation, 2nd edition, John Wiley & Sons Ltd in association with SITA Technology Ltd, London, U K, 1998 edited by Dr. G. Bradley; ISBN 0471 978922, page 208-224.

Tertiary Amine Co-initiators

If the at least one polymerizable or polymeric thioxanthone contains no tertiary amine group then the radiation curable composition further includes at least one tertiary amine co-initiator selected from the group consisting of ethylhexyl-4-dimethylaminobenzoate, a polymerizable co-initiator containing a tertiary amine and a polymeric co-initiator containing a tertiary amine.

A combination of a polymerizable co-initiator containing a tertiary amine and a polymeric co-initiator containing a tertiary amine may be advantageously used to adjust the viscosity of the radiation curable composition.

Ethyl hexyl-4-dimethylaminobenzoate (EHA) is preferably present in the radiation curable composition in an amount of 0.5 wt % to 5.0 wt %, more preferably in an amount of 1.0 to 4.0 wt % and most preferably 3 wt % or less, wherein all wt % are based on the total weight of the radiation curable composition.

The at least one tertiary amine co-initiator may also be a polymerizable co-initiator containing a tertiary amine, more preferably a polymerizable co-initiator containing one or The radiation curable composition preferably contains the polymerizable co-initiator containing a tertiary amine in an amount of 1.0 to 10.0 wt %, more preferably 2.0 to 7.0 wt % and most preferably 3.0 to 5.0 wt % wherein all wt % are based on the total weight of the radiation curable composition.

The at least one tertiary amine co-initiator may also be a polymeric co-initiator containing a tertiary amine, more preferably a polymeric co-initiator containing one or more 4-dialkylaminobenzoate groups, most preferably a polymeric co-initiator containing one or more 4-dimethylaminobenzoate groups. Other preferred tertiary amine groups for the at least one polymeric co-initiator containing a tertiary amine include aliphatic tertiary amine groups and piperazine groups.

In a preferred embodiment, the at least one polymeric co-initiator containing a tertiary amine is a polyether based polymer. Particularly preferred polymeric co-initiators are derivatives from ethoxylated trimethylolpropane, propoxylated trimethylolpropane, polyethylene oxide, polypropylene oxide, ethoxylated neopentyl glycol, propoxylated neopentylglycol, ethyleneoxide propylene oxide copolymers, ethoxylated glycerol, propoxylated glycerol, ethoxylated pentaerithritol, propoxylated pentaerythritol and polytetrahydrofurane.

In a further preferred embodiment, the at least one polymeric co-initiator containing a tertiary amine has a numeric average molecular weight of no more than 1500, more preferably of no more than 1000 and most preferably of no more than 750.

In another preferred embodiment, the radiation curable composition contains 1.0 to 25.0 wt %, more preferably 2.0 to 10.0 w % and most preferably 3.0 to 7.0 wt % wherein all wt % are based on the total weight of the radiation curable composition.

In a particularly preferred embodiment, the polymeric co-initiator containing a tertiary amine is selected from the group consisting of:

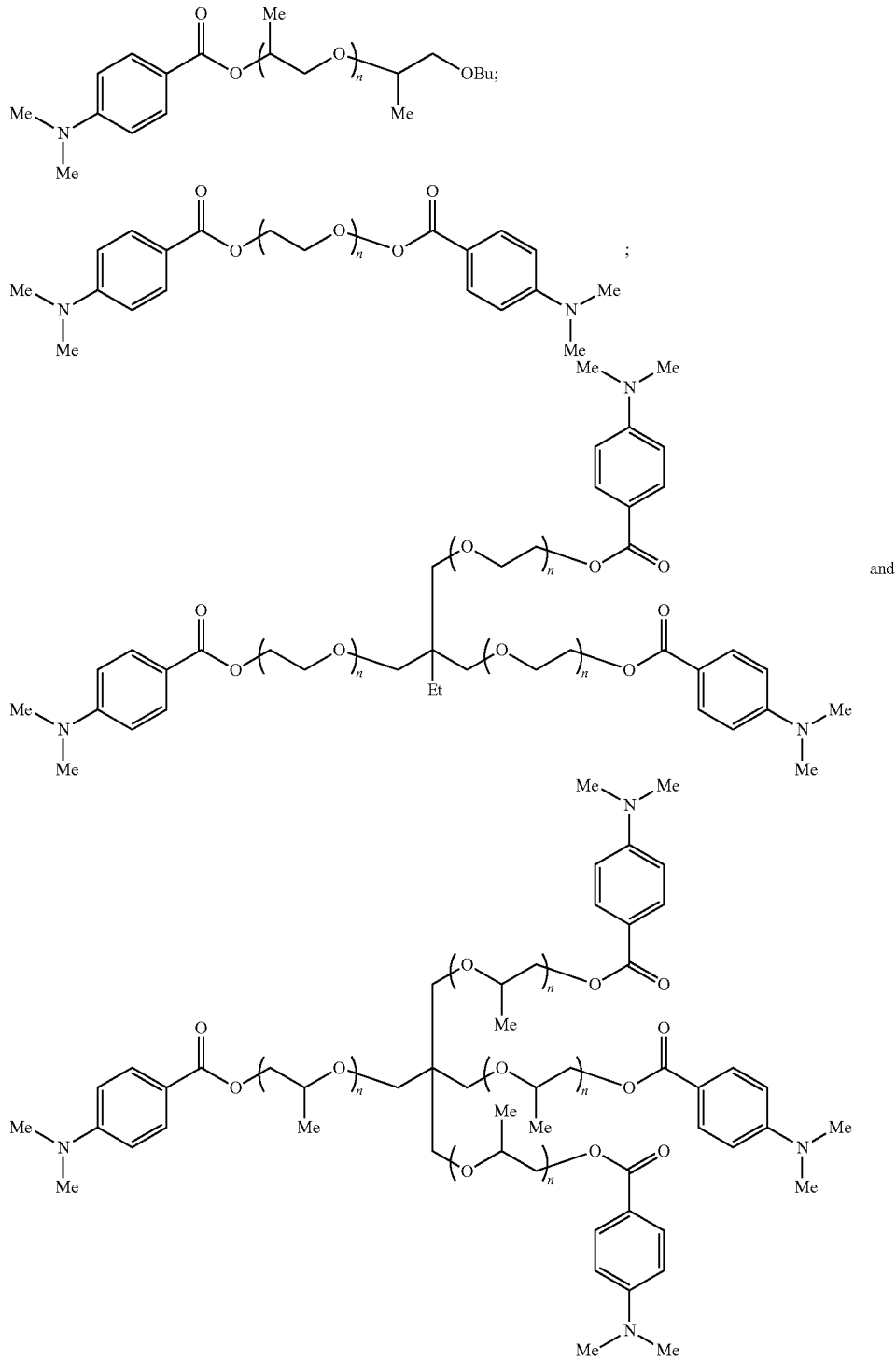

wherein the compound has a has a numeric average molecular weight of no more than 1500 or wherein n is an integer of 1 to 4. Suitable corresponding polymeric co-initiator containing a tertiary amine are commercially available as Omnipol™ ASA (CASRN71512-90-8) from IGM Resins, Genopol™ AB-1 and AB-2 (CASRN1215019-68-3) from RAHN, and Speedcure™ 7040 (CASRN1182751-31-0) from LAMBSON.

Preferred polymeric co-initiators containing a tertiary amine are polymeric co-initiators having a dendritic polymeric architecture, more preferably a hyperbranched polymeric architecture. Preferred hyperbranched polymeric co-initiators are those disclosed in US 2006014848 (AGFA).

Other Photoinitiators and Co-initiators

In addition to the at least one non-polymerizable, non-polymeric bisacylphosphine oxide and the at least one polymerizable or polymeric thioxanthone, the radiation curable composition or inkjet ink may contain one or more other photoinitiators and/or co-initiators.

For primary food packaging applications, these one or more other photoinitiators are preferably selected from the group consisting of polymerizable photoinitiators, polymeric photoinitiators and multifunctional photoinitiators. A multifunctional photoinitiator is a photoinitiator having two or more photoinitiating groups, e.g. two benzophenone groups and a thioxanthone group. In a more preferred embodiment, the one ore more other photoinitiators are a polymerizable photoinitiator. Such a photoinitiator results in a smaller viscosity than a polymeric photoinitiator while still minimizing health risks in food packaging applications.

The photoinitiator in the free radical radiation curable inkjet ink is a free radical initiator, more specifically a Norrish type I initiator or a Norrish type II initiator. A free radical photoinitiator is a chemical compound that initiates polymerization of monomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or a co-initiator. Both type I and type II photoinitiators can be used in the present invention, alone or in combination. The free radical radiation curable inkjet ink preferably includes no cationic photoinitiator.

The polymerizable photoinitiators may be combined with other type of non-polymeric or non-polymerizable photoinitiators, for food packaging applications at concentration levels in the inkjet ink causing no health risks, e.g. due to migration into the foodstuff.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 1000, Irgacure™ 1300, Irgacure™ 1870, Darocur™ 1173, Darocur™ 2959, Darocur™ 4265 and Darocur™ ITX available from BASF AG, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For a low migration radiation curable composition or inkjet ink, the photoinitiator preferably consists of so-called diffusion hindered photoinitiator. A diffusion hindered photoinitiator is a photoinitiator which exhibits a much lower mobility in a cured layer of the radiation curable inkjet ink than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators.

Most preferably the photoinitiators in the radiation curable inkjet ink consist of one or more diffusion hindered photoinitiators, preferably one or more polymerizable or polymeric photoinitiators, and more preferably polymerizable photoinitiators.

Preferred diffusion hindered photoinitiators contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

Preferred diffusion hindered photoinitiators contain one or more photoinitiating functional groups derived from a Norrish type II-initiator selected from the group consisting of benzophenones, 1,2-diketones and anthraquinones.

Suitable diffusion hindered photoinitiators are also those disclosed in EP 2065362 A (AGFA) and EP 2161264 A (AGFA).

In a photoinitiating system, one of the photoinitiators can also function as a sensitizer enhancing the reactivity of another photoinitiator. Preferred sensitizers are polymerizable sensitizers such as those disclosed in EP 2053095 A (FUJIFILM).

In order to increase the photosensitivity further, the free radical radiation curable composition or inkjet ink may additionally contain no non-polymerizable, no non-polymeric co-initiators. Suitable examples of these co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino) benzoate, and 2-ethylhexyl-4-(dimethylamino)benzoate; and (3) (meth)acrylated amines such as dialkylamino alkyl (meth)acrylates (e.g., diethylaminoethylacrylate) or N-morpholinoalkyl-(meth)acrylates (e.g., N-morpholinoethylacrylate). The preferred co-initiators are aminobenzoates. When one or more of these co-initiators are included into the radiation curable inkjet ink, for food packaging applications amounts are used causing no health risks, e.g. due to migration into the foodstuff.

The free radical radiation curable composition or inkjet ink preferably includes the other co-initiator in an amount of 0.1 to 10.0 wt %, more preferably in an amount of 0.5 to 5.0 wt %, most preferably in an amount of 1.0 to 3.0 wt % of the total weight of the free radical radiation curable composition or inkjet ink.

The radiation curable composition preferably does not include a photoinitiator selected from the group of 2-hydroxy 2-methyl propiophenone, benzophenone, 2-methyl benzophenone, 4-methyl benzophenone, 2,4,6-trimethyl-benzo-phenone, 1-hydroxycyclohexyl phenylketone, 2,2-dimethoxy 2-phenyl acetophenone, 2-methyl 4'-(methylthio) 2-morpholinopropiophenone, 4-isopropyl 9H-thioxanthen-9-one, 2-isopropyl 9H-thioxanthen-9-one, and 2,4-diethyl 9H-thioxanthen-9-one. Such a radiation curable composition has no doubtful toxicology.

Monomers Containing Vinylether Groups and (Meth)Acrylate Groups

The radiation curable composition contains at least one monomer comprising at least one vinyl ether group and at least one polymerizable group selected from the group consisting of an acrylate group and a methacrylate group, wherein this monomer is preferably represented by Formula (III):

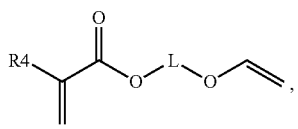

Formula (III)

Wherein
$R^4$ represents a hydrogen or a methyl group;
L represents a divalent linking group selected from the group consisting of a substituted or unsubstituted alkylene group, a substituted or unsubstituted alkenylene group, a substituted or unsubstituted alkynylene group, a substituted or unsubstituted cycloalkylene group and an ether containing alkylene group.

In a further preferred embodiment, the monomer comprising at least one polymerizable group selected from the group consisting of an acrylate and a methacrylate and at least one vinyl ether is represented by Formula (IV):

Formula (IV)

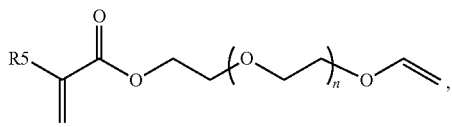

wherein:
$R^5$ represents a hydrogen or a methyl group; and
n represents an integer from 0 to 4. In the most preferred embodiment, R4 and R5 represent hydrogen.

The at least one monomer comprising at least one vinyl ether group and at least one (meth)acrylate group is preferably selected from the group consisting of:

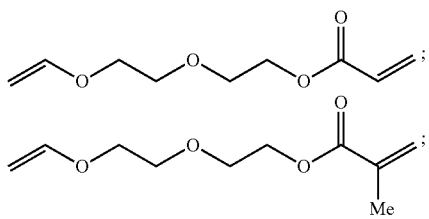

In the most preferred embodiment of the radiation curable composition, the at least one monomer comprising at least one vinyl ether group and at least one polymerizable group selected from the group consisting of an acrylate group and a methacrylate group is 2-(2-vinyloxyethoxy)ethyl acrylate.

Other suitable vinylether (meth)acrylates are those disclosed in columns 3 and 4 of U.S. Pat. No. 6,767,980 (NIPPON SHOKUBAI).

A single compound or a mixture of vinylether acrylates may be used.

The radiation curable composition according to a preferred embodiment of the present invention contains at least 10 wt %, more preferably at least 20 wt % and most preferably at least 25 wt % of the monomer according to Formula (III) or (IV), wherein all wt % are based on the total weight of the radiation curable composition.

In a particularly preferred embodiment of the radiation curable composition, it includes a polymerizable composition consisting essentially of: a) 25 to 100 wt % of a monomer according to Formula (III) or (IV), preferably 2-(2-vinyloxyethoxy)ethyl acrylate; b) 0 to 55 wt % of one or more polymerizable compounds A selected from the group consisting of monofunctional acrylates and difunctional acrylates; and c) 0 to 55 wt % of one or more polymerizable compounds B selected from the group consisting of trifunctional acrylates, tetrafunctional acrylates, pentafunctional acrylates and hexafunctional acrylates, with the proviso that if the weight percentage of compounds A>24 wt %, then the weight percentage of compounds B>1 wt %; and wherein all weight percentages of A and B are based upon the total weight of the polymerizable composition.

Other Monomers and Oligomers

The radiation curable composition or inkjet ink may include one or more other monomers and/or oligomers than the at least one monomer comprising at least one vinyl ether group and at least one polymerizable group selected from the group consisting of an acrylate group and a methacrylate group.

Any monomer and oligomer capable of free radical polymerization may be used in the radiation curable composition or inkjet ink. The monomers and oligomers may have different degrees of polymerizable functionality, and a mixture including combinations of mono-, di-, tri- and higher polymerizable functionality monomers may be used. The viscosity of the radiation curable inkjet ink can be adjusted by varying the ratio between the monomers.

The monomers and oligomers used, especially for food packaging applications, are preferably purified compounds having no or almost no impurities, more particularly no toxic or carcinogenic impurities. The impurities are usually derivative compounds obtained during synthesis of the polymerizable compound. Purification methods are well-known to those skilled in the art of manufacturing monomers and oligomers. Sometimes, however, some compounds may be added deliberately to pure polymerizable compounds in harmless amounts, for example, polymerization inhibitors or stabilizers.

Particularly preferred monomers and oligomers are those listed in [0106] to [0115] in EP 1911814 A (AGFA).

In a preferred embodiment, the radiation curable composition or inkjet ink includes at least one monomer selected from the group consisting of N-vinyl caprolactam, phenoxyethyl acrylate, dipropyleneglycoldiacrylate, ethoxylated trimethylolpropane triacrylate, pentaerythritol tetraacrylate, and cyclic trimethylolpropane formal acrylate.

For achieving high printing speeds, preferably low viscous monomers are used so that a low viscosity for the free radical radiation curable inkjet ink can be obtained. However, in industrial inkjet printing also a high reliability is required which allows the incorporation of the inkjet printing system into a production line. In a preferred embodiment, the low viscous monomer loses less than 15% of its weight when kept at 40° C. for 100 hours in an open cubic vessel.

Colorants

The radiation curable inkjet ink may contain a colorant. Colorants used in the curable inks may be dyes, pigments or a combination thereof. Organic and/or inorganic pigments may be used.

The colorant is preferably a pigment or a polymeric dye, most preferably a colour pigment. In food packaging applications, low molecular weight dyes, e.g. smaller than 1000 Dalton, can still migrate into the food or be extracted by the food giving undesired coloration of the food, or even worse allergic reactions after consuming the solid or liquid food.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley—VCH, 2004. ISBN 3527305769.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 88, 112, 122, 144, 146, 149, 170, 175, 176, 184, 185, 188, 202, 206, 207, 210, 216, 221, 248, 251, 254, 255, 264, 266, 270 and 272.

Particular preferred pigments are C.I. Pigment Violet 19, 23, 32, and 37.

Particular preferred pigments are C.I. Pigment Blue 15:1, 15:2, 15:3, 15:4, 15:6, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from BASF AG.

Carbon black is preferred as a black pigment. Suitable black pigments include carbon blacks such as Pigment Black 7 (e.g. Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. In a preferred embodiment, the carbon black pigment used is a pigment having less than 0.15% of toluene-extractable fraction using the method as described in section III, paragraph 5 of the Resolution AP(89) 1 dated 13 Sep. 1989 published by the Council of Europe.

It is also possible to make mixtures of pigments. For example, in some inkjet ink application a neutral black inkjet ink is preferred and can be obtained e.g. by mixing a black pigment and a cyan pigment into the ink. Also pigments may be combined to enlarge the colour gamut of an ink set. The inkjet application may also require one or more spot colours. Silver and gold are often desired colours for making a product more attractive by giving it an exclusive appearance.

Also non-organic pigments may be present in the inks. Suitable pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black. However, care should be taken to prevent migration and extraction of heavy metals in food application. In the preferred embodiment no pigments are used which contain a heavy metal selected from the group consisting of arsenic, lead, mercury and cadmium. In a more preferred embodiment, no inorganic pigments are used in the inkjet ink with the exception of titanium oxide, and calcium carbonate.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased light-fastness, but mainly also because very small pigment particles or individual pigment molecules thereof may still be extracted in food packaging applications.

The numeric average pigment particle size of pigment particles is best determined with a Brookhaven Instruments Particle Sizer BI90plus based upon the principle of dynamic light scattering. The ink is then diluted, for example, with ethyl acetate to a pigment concentration of 0.002 wt %. The measurement settings of the BI90plus are: 5 runs at 23° C., angle of 90°, wavelength of 635 nm and graphics=correction function.

In the case of a white radiation curable ink, preferably a pigment with a refractive index greater than 1.60, preferably greater than 2.00, more preferably greater than 2.50 and most preferably greater than 2.60 is used. The white pigments may be employed singly or in combination.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable.

The numeric average particle diameter of the titanium oxide or other white pigments is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Generally pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

The pigment is preferably used in a pigment dispersion used for preparing inkjet inks in an amount of 10 to 40 wt %, more preferably of 15 to 30 wt % based on the total weight of the pigment dispersion. In a curable inkjet ink the pigment is preferably present in an amount of 0.1 to 20 wt %, preferably 1 to 10 wt % based on the total weight of the inkjet ink.

Polymeric Dispersants

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

- DISPERBYK™ dispersants available from BYK CHEMIE GMBH;
- SOLSPERSE™ dispersants available from LUBRIZOL;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from BASF;
- DISPONER™ dispersants from DEUCHEM.

Particularly preferred polymeric dispersants include Solsperse™ dispersants from LUBRIZOL, Efka™ dispersants from BASF and Disperbyk™ dispersants from BYK CHEMIE GMBH. Particularly preferred dispersants are Solsperse™ 32000, 35000 and 39000 dispersants from LUBRIZOL.

The polymeric dispersant is preferably used in an amount of 2 to 600 wt %, more preferably 5 to 200 wt %, most preferably 50 to 90 wt % based on the weight of the pigment.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The dispersion synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from LUBRIZOL.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from LUBRIZOL is preferred. Suitable dispersion synergists for yellow inkjet inks include those disclosed in EP 1790697 A (AGFA GRAPHICS).

Polymerization Inhibitors

The radiation curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from BASF; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total (inkjet) ink.

In a preferred embodiment, the polymerization inhibitor is a polymerizable inhibitor, preferably containing one or more acrylate groups for achieving good reactivity.

Surfactants

The radiation curable composition or inkjet ink may contain at least one surfactant. The surfactant can be anionic, cationic, non-ionic, or zwitter-ionic and is preferably added in a total quantity less than 3 wt % based on the total weight of the ink and particularly in a total less than 1 wt % based on the total weight of the free radical curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplanen™ FM7721, Silaplanen™ FM7731, Silaplanen™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Preparation of Radiation Curable Compositions and Inkjet Inks

The method of preparing a radiation curable composition is preferably made by mixing: a) at least one non-polymerizable, non-polymeric bisacylphosphine oxide; b) at least one monomer comprising at least one vinyl ether group and at least one polymerizable group selected from the group consisting of an acrylate group and a methacrylate group; and c) at least one polymerizable or polymeric thioxanthone, with the proviso that if the at least one polymerizable or polymeric thioxanthone contains no tertiary amine group that the radiation curable composition further includes at least one tertiary amine co-initiator selected from the group consisting of ethylhexyl-4-dimethylaminobenzoate, a polymerizable co-initiator containing a tertiary amine and a polymeric co-initiator containing a tertiary amine.

The preparation of pigmented radiation curable inkjet inks is well-known to the skilled person. Preferred methods of preparation are disclosed in paragraphs [0076] to [0085] of WO 2011/069943 (AGFA).

Inkjet Printing Methods

An inkjet printing method according to a preferred embodiment of the invention includes the steps of: (1) jetting ink dots on a substrate of a radiation curable inkjet ink comprising a) at least one non-polymerizable, non-polymeric bisacylphosphine oxide; b) at least one monomer comprising at least one vinyl ether group and at least one polymerizable group selected from the group consisting of an acrylate group and a methacrylate group; and c) at least one polymerizable or polymeric thioxanthone, with the proviso that if the at least one polymerizable or polymeric thioxanthone contains no tertiary amine group that the radiation curable composition further includes at least one tertiary amine co-initiator selected from the group consisting of ethylhexyl-4-dimethylamino benzoate, a polymerizable co-initiator containing a tertiary amine and a polymeric co-initiator containing a tertiary amine; wherein said bisacylphosphine oxide is present in a concentration of no more than 4 w % based on the total weight of the radiation curable compositions defined above; and (2) at least partially curing the jetted ink dots. The at least partially curing of the radiation curable inkjet ink is preferably performed using one or more UV LEDs.

Inkjet Printing Devices

The radiation curable composition or inkjet ink may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing, also known as multi-pass printing, is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The radiation curable composition or inkjet ink can be cured by exposure to actinic radiation, preferably to ultraviolet radiation.

In inkjet printing, the curing device may be arranged in combination with the print head of the inkjet printer, travelling therewith so that the curing radiation is applied very shortly after jetting. Such rapid curing is sometimes referred to as "pin curing" and used for enhancing image quality by controlling the dot size. Preferably such curing device consists of one or more UV LEDs. In such an arrangement, it can be difficult to provide other types of curing device that are small enough to be connected to and travelling with the print head. Therefore, a static fixed radiation source may be employed, e.g. a source of curing UV-light, connected to the radiation source by a flexible radiation conductor such as a fibre optic bundle or an internally reflective flexible tube. Alternatively, the actinic radiation may be supplied from a fixed source to the radiation head by an arrangement of mirrors including a mirror upon the print head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
 UV-A: 400 nm to 320 nm
 UV-B: 320 nm to 290 nm
 UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Substrates and Packaging

There is no real limitation on the type of substrate. The substrates may have ceramic, metallic, wood, paper or polymeric surfaces for printing. The substrate may also be primed, e.g. by a white primer or ink. However, the advantages of the radiation curable compositions and inkjet of the invention can be especially advantageously used on substrates for food packaging or pharmaceuticals. Food packaging is understood to include also packaging for liquids and drinks like milk, water, coke, beer, vegetable oil and the like.

Preferred embodiments of the invention re advantageously used for providing food packaging, especially "primary" food packaging. Primary food packaging is the material that first envelops the product and holds it. This usually is the smallest unit of distribution or use and is the package which is in direct contact with the contents. Of course, for reasons of food safety, the radiation curable compositions and inkjet inks may also be used for secondary and tertiary packaging. Secondary packaging is outside the primary packaging, perhaps used to group primary packages together. Tertiary packaging is used for bulk handling, warehouse storage and transport shipping. The most common form of tertiary packaging is a palletized unit load that packs tightly into containers.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 $g/cm^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment, the substrate is a packaging, more preferably a food packaging, such as a wrapping for a chocolate bar.

EXAMPLES

Materials

All materials used in the following examples were readily available from standard sources such as Sigma-Aldrich (Belgium) and Acros (Belgium) unless otherwise specified. The water used is demineralized water.

PB15:4 is a C.I. Pigment Blue 15:4 pigment for which Sun Fast™ Blue 15:4 from SUN CHEMICAL was used.

PV19 is a C.I. Pigment Violet 19 pigment for which Sun Quindo™ Red 19 from SUN CHEMICAL was used.

PR57 is a C.I. Pigment Red 57.1 pigment for which Symyler™ Brilliant Carmine 6B350SD from SUN CHEMICAL was used.

PY150 is a C.I. Pigment Yellow 150 pigment for which Cromophtal™ yellow LA2 from BASF was used.

SB550 is a carbon black pigment for which Special Black™ 550 from EVONIK (DEGUSSA) was used.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed. The polymeric dispersant is a polyester-polyurethane dispersant on the basis of caprolacton and toluene diisocyanate having an amine value of 13 mg KOH/g, a Mn of about 4,425 and a Mw of about 6,270.

IC819 is bis(2,4,6-trimethylbenzoyl)-phenylphosphineoxide photoinitiator available as Irgacure™ 819 from BASF.

BHT is an abbreviation for 2,6-di-tert.butyl-4-methylphenol (CASRN128-37-0) from ALDRICH CHEMICAL CO.

STAB UV10 is 4-hydroxy-2,2,6,6-tetramethylpiperidinooxy sebacate available as Irgastab™ UV 10 from BASF.

EHA is 2-ethylhexyl 4-dimethylaminobenzoate available as Genocure™ EHA from RAHN.

INHIB is a mixture forming a polymerization inhibitor having a composition according to Table 3.

TABLE 3

| Component | wt % |
|---|---|
| VEEA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

VEEA is 2-(2-vinyloxyethoxy)ethyl acrylate, a difunctional monomer available from Nippon Shokubai, Japan.

DPGDA is dipropyleneglycoldiacrylate from SARTOMER.

Esacure™ KIP160 is a difunctional α-hydroxyketone available from LAMBERTI and having the chemical structure:

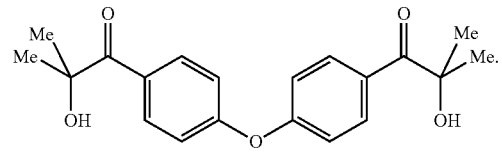 [SMILES: CC(C)(O)C(=O)c1ccc(Oc2ccc(C(=O)C(C)(C)O)cc2)cc1]

KIPVEEA is a polymerizable Norrish type I initiator having the chemical structure:

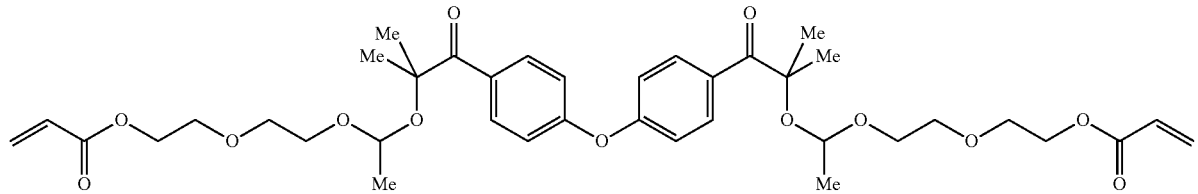 [SMILES: C=CC(=O)OCCOCCOC(C)OC(C)(C)C(=O)c1ccc(Oc2ccc(C(=O)C(C)(C)OC(C)OCCOCCOC(=O)C=C)cc2)cc1]

and was prepared as follows:

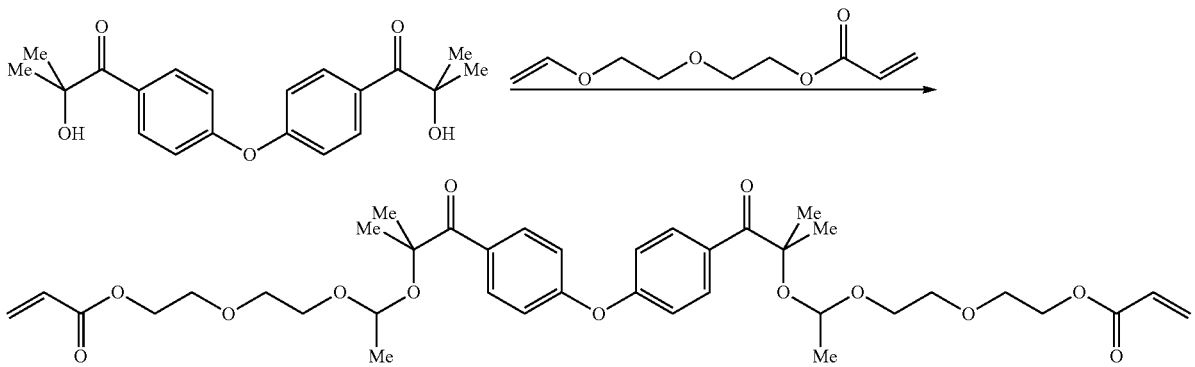

A mixture of 119.75 g (0.350 mol) Esacure™ KIP160, 380.10 g VEEA and 1.54 g BHT was heated to 85° C. 9.99 g of poly(vinylpryridinium) tosylate was added and the reaction was allowed to continue for 10 hours at 85° C. The reaction mixture was allowed to cool down to room temperature and the catalyst was removed by filtration. The solution was used as such in both the comparative and inventive ink set. The concentration was determined by $^1$H-NMR analysis of the solution. The initiator concentration was 51.6% by weight.

AXANTH is a polymerizable thioxanthone according to Formula (AX-1):

heated to 60° C. and 363 g (3 mol) tris(hydroxymethyl)aminomethane and 415 g (3 mol) potassium carbonate were added. The reaction was allowed to continue for 2 hours at 60° C. The reaction mixture was allowed to cool down to room temperature. The precipitated salts were removed by filtration and the reaction mixture was added to a mixture of 1500 ml water and 250 ml acetone. The intermediate thioxanthone precipitated from the medium, was isolated by filtration and dried. The crude thioxanthone was treated with 1500 ml acetone, isolated by filtration and dried. 260 g of the

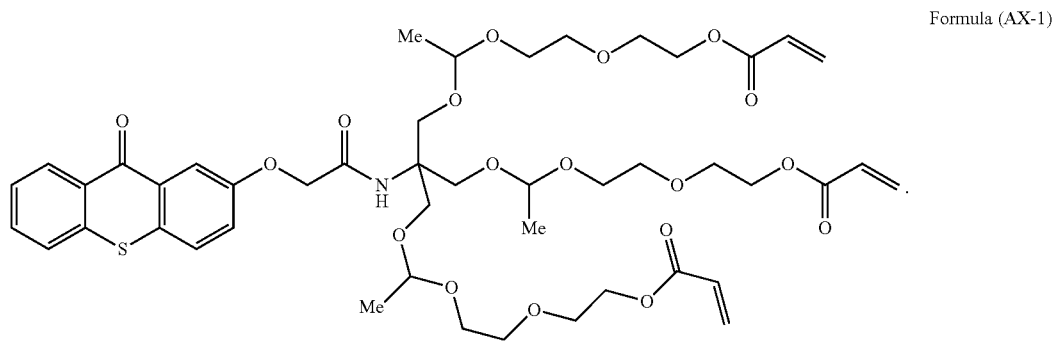 [SMILES: C=CC(=O)OCCOCCOC(C)OCC(COC(C)OCCOCCOC(=O)C=C)(COC(C)OCCOCCOC(=O)C=C)NC(=O)COc1ccc2sc3ccccc3c(=O)c2c1]

Formula (AX-1)

This photoinitiators was synthesized as follows:

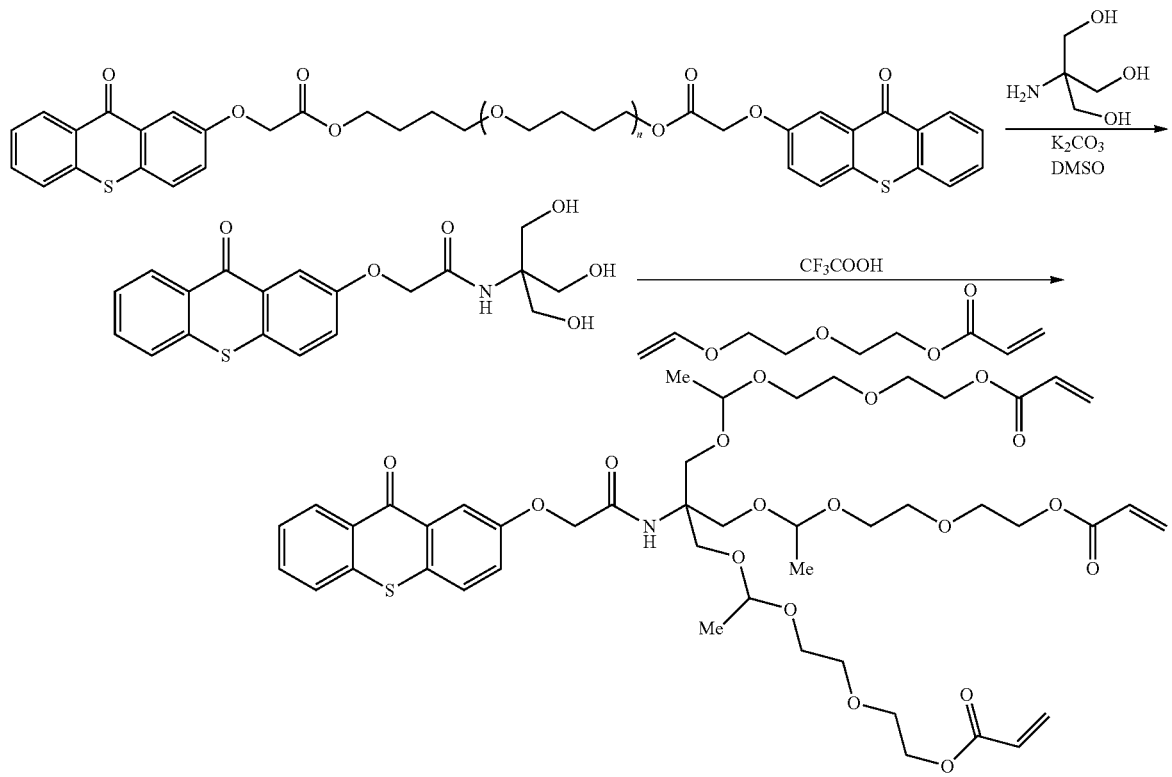

Step 1: The Aminolysis of Omnipol™ TX 395 g Omnipol™ TX, supplied by IGM, was dissolved in 1850 ml dimethyl sulfoxide. The reaction mixture was thioxanthone was isolated (TLC-analysis: RP-C18 (Partisil™ KC18F, supplied by Whatman), eluent MeOH/0.5 M NaCl, $R_f$=0.55). TLC analysis showed the presence of a small amount of an isomeric structure ($R_f$=0.60). The following structure was assigned to the isomer:

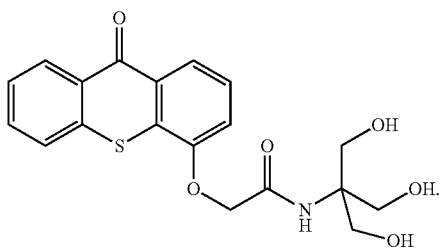 [SMILES: O=C(COc1cccc2c(=O)c3ccccc3sc12)NC(CO)(CO)CO]

The intermediate was further used as a mixture of the main isomer and the minor isomer.

Step 2: The Addition to VEEA:

22 g (58 mmol) of the amido-trihydroxy-thioxanthone was added to 227.8 g (1.224 mol) VEEA. 0.13 g (86 μl, 1.16 mmol) trifluoroacetic acid and 0.25 g (1.16 mmol) BHT were added and the mixture was heated to 77° C. The reaction was allowed to continue at 77° C. for 16 hours. The reaction was allowed to cool down to room temperature and 20 g of activated Lewatit M600 MB was added. The mixture was stirred for four hours at room temperature. The ion exchanger was removed by filtration. AX-1 was used as a solution in VEEA. (TLC-analysis: RP-C18 (Partisil™ KC18F, supplied by Whatman), eluent: MeOH/0.5 M NaCl 80/20, $R_f$=0.18). Based on $^1$H-NMR analysis, the solution contained 19 wt % AX-1.

UV3510 is Byk™ UV3510, a polyether modified poly-dimethylsiloxane, supplied by BYK Chemie GmbH.

BYK™ 333 is a polyether modified polydimethylsiloxane from BYK Chemie GmbH.

PET100 is a 100 μm unsubbed PET substrate with on the backside an antiblocking layer with antistatic properties available from AGFA-GEVAERT as P100C PLAIN/ABAS.

SR295 is pentaerythritol tetraacrylate available as Sartomer™ 295 from SARTOMER.

BP-1 V125420 is a 30 wt % solution in VEEA of the polymerizable benzophenone according to Formula:

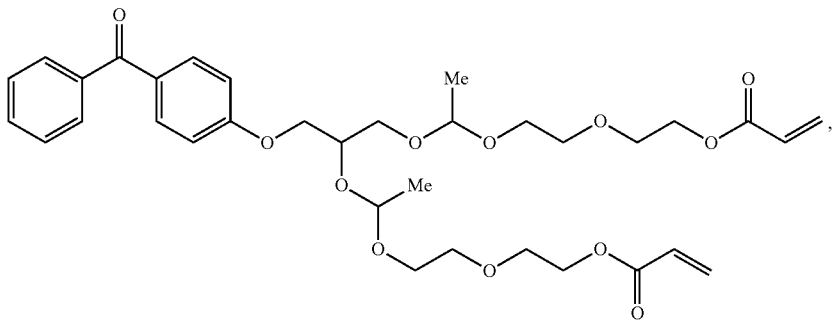 [SMILES: C=CC(=O)OCCOCCOC(C)OCC(COc1ccc(C(=O)c2ccccc2)cc1)OC(C)OCCOCCOC(=O)C=C]

BP-1 was prepared according to WO 2010/069758 (AGFA), see synthesis of INI-7.

Omnipol™ BP is a polymeric benzophenone available from IGM Resins.

Genopol™ AB-1 is a polymeric tertiary amine available from RAHN.

TN-1b is a polymerizable thioxanthone containing a tertiary amine according to the Formula:

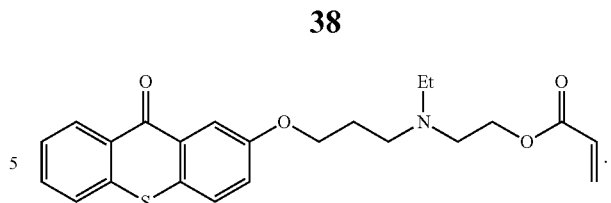

TN-1b was prepared according to WO 2009/147057 (AGFA), see synthesis of INI-12.

EPD is ethyl 4-dimethylaminobenzoate, available under the trade name of Genocure™ EPD from RAHN AG.

EPDPOL is a polymerizable co-initiator, having the following structure:

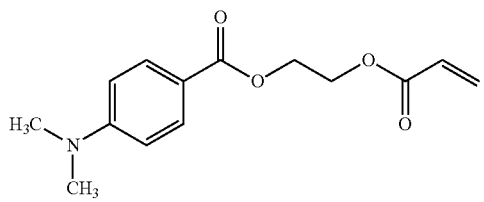 [SMILES: C=CC(=O)OCCOC(=O)c1ccc(N(C)C)cc1]

and was prepared as disclosed in example 1 of EP 2033949 A (AGFA).

Measurement Methods

1. Viscosity

The viscosity of the inkjet ink was measured using a Brookfield DV-II+ viscometer at 25° C. at 12 rotations per minute (RPM) using a CPE 40 spindle. This corresponds to a shear rate of 90 s$^{-1}$.

Evaluation was made in accordance with a criterion described in Table 4.

TABLE 4

| Evaluation | Criterion |
|---|---|
| OK | ≤50 mPa · s |
| Not OK | >50 mPa · s |

2. Surface Tension

The static surface tension of the radiation curable inks was measured with a KRÜSS tensiometer K9 from KRÜSS GmbH, Germany at 25° C. after 60 seconds.

3. Average Particle Size

The particle size of pigment particles in a pigment dispersion was determined by photon correlation spectroscopy at a wavelength of 633 nm with a 4 mW HeNe laser on a diluted sample of the pigment dispersion. The particle size analyzer used was a Malvern™ nano-S available from Goffin-Meyvis.

The sample was prepared by addition of one drop of pigment dispersion to a cuvette containing 1.5 mL ethyl acetate and mixed until a homogenous sample was obtained. The measured particle size is the average value of 3 consecutive measurements consisting of 6 runs of 20 seconds.

3. LED Curing Speed

A radiation curable composition was coated on A PET100 substrate, using a bar coater and a 10 μm wired bar. The coated sample was mounted on a belt, transporting the sample under a Phoseon™ Fire Line 125 LED curing device with an output wavelength of 395 nm, at a speed of 30 m/min using 4 W output at a distance of 4.5 mm from the LED. The curing speed was evaluated based on visual damage when using a Q-tip, resulting in a score varying from 0 for no visual damage at all, up to 5 for complete wiping away the coating.

Evaluation was made in accordance with a criterion described in Table 5.

TABLE 5

| Evaluation | Criterion |
|---|---|
| OK | score of 0 and 1 |
| Not OK | score from 3 to 5 |

4. Migrateables

Prior to analysis, several sheets of the samples were stacked and stored for 10 days at 45° C. with a weight of 60 kg on top to mimic set-off from the printed side to the food side as can be encountered in roll-to-roll printing or stacking of the printed matter. The sample in the middle of the stack was used for analysis. Extraction cells conform EN1186-1 (cell type B) were used in the migration experiments. Two circles with a diameter of 15 cm were cut from a printed sample. The two circles were mounted in the extraction cells with the non coated side in contact with the extraction solvent. The cells were closed and the cells were filled with iso-octane as food simulant. The cells were stored at 20° C. for 2 days. The extract was filtered over a 0.2 μm filter and analyzed with HPLC for quantification of the different ink components.

The chromatographic method used an Alltech Alltima™ C18 5 μm column (150×3.2 mm) supplied by Grace. A flow rate of 0.5 ml/min was used at a temperature of 40° C. Different HPLC gradient runs were used to avoid errors in the detected amounts of ink components by overlap of peaks. The gradient conditions and solvents used are summarized in Table 4 to Table 8. Diode array detection was used at 204 nm for the acrylates and at the respective specific absorption maxima of the different ink compounds.

15 μL of the extract were injected and the concentration of the different ink components was determined using reference samples. The same injection volume was used for the reference solutions. Depending on the ink compound between 1 and 10 mg of these references were dissolved in 50 ml $CH_3CN$ and diluted thereof. Calibration lines were set up from 5 food ppb up to 100 food ppb. If the calibrations showed a linear behaviour a one point calibration of 10 food ppb was used.

TABLE 6

| Solvent type | Solvent |
|---|---|
| A | $H_2O$ |
| B | $CH_3CN$ |
| C | Distilled water + 0.02M $KH_2PO_4$ pH = 2.5 |
| D | 40/60 $H_2O/CH_3CN$ + 0.02M $KH_2PO_4$ |
| E | 40/60 $H_2O/CH_3CN$ |
| F | 10/90 $H_2O/CH_3CN$ |
| G | $CH_3OH$ |

TABLE 7

| Time (min) | % A | % B |
|---|---|---|
| 0 | 55 | 45 |
| 6 | 55 | 45 |
| 11 | 0 | 100 |
| 30 | 0 | 100 |
| 31 | 55 | 45 |
| 38 | 55 | 45 |

TABLE 8

| Time (min) | % A | % B |
|---|---|---|
| 0 | 55 | 45 |
| 6 | 55 | 45 |
| 30 | 0 | 100 |
| 49 | 0 | 100 |
| 50 | 55 | 45 |
| 57 | 55 | 45 |

TABLE 9

| Time (min) | % C | % D | % E | % F |
|---|---|---|---|---|
| 0 | 70 | 30 | 0 | 0 |
| 6 | 70 | 30 | 0 | 0 |
| 11 | 0 | 100 | 0 | 0 |
| 20 | 0 | 100 | 0 | 0 |
| 21 | 0 | 0 | 100 | 0 |
| 24 | 0 | 0 | 100 | 0 |
| 25 | 0 | 0 | 0 | 100 |
| 30 | 0 | 0 | 0 | 100 |
| 31 | 70 | 30 | 0 | 0 |
| 38 | 70 | 30 | 0 | 0 |

TABLE 10

| Time (min) | % A | % G |
|---|---|---|
| 0 | 40 | 60 |
| 6 | 40 | 60 |
| 30 | 0 | 100 |
| 40 | 0 | 100 |
| 41 | 40 | 60 |
| 49 | 40 | 60 |

Evaluation was made in accordance with a criterion described in Table 11.

TABLE 11

| Evaluation | Criterion |
|---|---|
| OK | Below migration thresholds listed in Annex 6 of the Swiss Ordinance 817.023.21 |
| Not OK | Above migration thresholds listed in Annex 6 of the Swiss Ordinance 817.023.21 |

5. Transport Stability

Two samples of a radiation curable composition were coated on a 50 μm thick PET film with a 5 μm styrene-butadiene-styrene coating for sealing using a bar coater and a 10 μm wired bar. The coated samples were cured using a Fusion DRSE-120 conveyer, equipped with a Fusion VPS/1600 lamp (D-bulb).

One of the radiation curable compositions was, before coating and curing, first stored for 7 days at 60° C. and then for 7 days at 8° C. This storage was a simulation of the temperatures that can occur during transport. The properties of LED curing speed and migrateables were compared for both samples.

Evaluation was made in accordance with a criterion described in Table 12.

TABLE 12

| Evaluation | Criterion |
|---|---|
| OK | No or minor difference in properties |
| Not OK | Major difference in properties |

6. Odor

A radiation curable composition was coated on A PET100 substrate, using a bar coater and a 10 μm wired bar. The coated sample was mounted on a belt, transporting the sample twice under a Phoseon™ Fire Line 125 LED curing device with an output wavelength of 395 nm, at a speed of 30 m/min using 12 W output at a distance of 4.5 mm from the LED. A sample of 4.5 cm×7 cm was cut into pieces of about 1 cm$^2$ and kept in a closed glass bottle for 2 hours at room temperature. The bottle was opened after 18 hours and a panel of four people evaluated the smell according to a criterion described in Table 13.

TABLE 13

| Evaluation | Criterion |
|---|---|
| 0 | No smell |
| 1 | Almost no smell |
| 2 | Weak smell |
| 3 | Clearly distinguishable smell |
| 4 | Strong smell |

An average was made of the evaluations given by the panel of four people.

Example 1

This example illustrates a low migration CMYK inkjet ink set having radiation curable compositions according to the present invention.

Preparation of Radiation Curable Inkjet Inks

First concentrated pigment dispersions CPC-1, CPM-1, CPM-2, CPY-1 and CPK-1 were prepared.

Preparation of Concentrated Cyan Pigment Dispersion CPC-1

A 30 wt % solution of DB162 in VEEA was prepared. 7.5 kg PB15:4 was added to a mixture of 16 kg VEEA, 25 kg of the DB162 solution and 50 g STAB UV10, while stirring with a DISPERLUX™ dispenser. Stirring was continued for 30 minutes. The vessel was connected to a Dynomill™ KD6 mill from the company Willy A. Bachofen (Switzerland), preloaded with 1.5 kg VEEA and filled for 52% with 0.4 mm yttrium stabilized zirconia beads ("high wear resistant zirconia grinding media" from TOSOH Co.). The mixture was circulated over the mill at a flow rate of 1.5 l/min and a rotation speed in the mill of about 16 m/s for a residence time of 22.5 minutes. After milling, the dispersion was discharged and filtered through a 1 μm Whatman™ filter. The resulting concentrated pigment dispersion CPC-1 according to Table 14 exhibited an average particle size of 88 nm and a viscosity of 77 mPa·s measured at 25° C. using a Haake™ Rotovisco at a shear rate of 10 s$^{-1}$.

TABLE 14

| Component | wt % |
|---|---|
| PB15:4 | 15.0 |
| DB162 | 15.0 |
| STAB UV10 | 0.1 |
| VEEA | 69.9 |

Preparation of Concentrated Magenta Pigment Dispersion CPM-1

A 30 wt % solution of DB162 in VEEA was prepared. 12 kg PV19 was added to a mixture of 26.5 kg VEEA, 40 kg of the DB162 solution and 800 g INHIB, while stirring with a DISPERLUX™ dispenser (from DISPERLUX S.A.R.L., Luxembourg). Stirring was continued for 30 minutes. The vessel was connected to a DYNO™-MILL ECM Pilot mill from the company Willy A. Bachofen (Switzerland), preloaded with VEEA and filled for 42% with 0.4 mm yttrium stabilized zirconia beads ("high wear resistant zirconia grinding media" from TOSOH Co.). The mixture was circulated over the mill at a flow rate of 8 l/min and a rotation speed in the mill of about 15 m/s for a residence time of 35 minutes. During the complete milling procedure the content in the mill was cooled to keep the temperature below 40° C. After milling, the dispersion was discharged and filtered through a 1 μm Whatman™ filter. The resulting concentrated pigment dispersion CPM-1 according to Table 15 exhibited an average particle size of 139 nm and a viscosity of 77 mPa·s measured at 25° C. using a Haake™ Rotovisco at a shear rate of 10 s$^{-1}$.

TABLE 15

| Component | wt % |
|---|---|
| PV19 | 15.0 |
| DB162 | 15.0 |
| INHIB | 1.0 |
| VEEA | 69.0 |

Preparation of Concentrated Magenta Pigment Dispersion CPM-2

A 30 wt % solution of DB162 in VEEA was prepared. 12 kg PR57 was added to a mixture of 26.5 kg VEEA, 40 kg of the DB162 solution and 800 g INHIB, while stirring with a DISPERLUX™ dispenser (from DISPERLUX S.A.R.L., Luxembourg). Stirring was continued for 30 minutes. The vessel was connected to a DYNO™-MILL ECM Pilot mill from the company Willy A. Bachofen (Switzerland), preloaded with VEEA and filled for 42% with 0.4 mm yttrium stabilized zirconia beads ("high wear resistant zirconia grinding media" from TOSOH Co.). The mixture was circulated over the mill at a flow rate of 8 l/min and a rotation speed in the mill of about 15 m/s for a residence time of 35 minutes. During the complete milling procedure the content in the mill was cooled to keep the temperature below 40° C. After milling, the dispersion was discharged and filtered through a 1 μm Whatman™ filter. The resulting concentrated pigment dispersion CPM-2 according to Table 16 exhibited an average particle size of 116 nm and a viscosity of 171 mPa·s measured at 25° C. using a Haake™ Rotovisco at a shear rate of 10 s$^{-1}$.

TABLE 16

| Component | wt % |
|---|---|
| PR57 | 15.0 |
| DB162 | 15.0 |
| INHIB | 1.0 |
| VEEA | 69.0 |

Preparation of Concentrated Yellow Pigment Dispersion CPY-1

A 30 wt % solution of DB162 in VEEA was prepared. 7.5 kg PY150 was added to a mixture of 16 kg VEEA, 25 kg of the DB162 solution and 500 g INHIB, while stirring with a DISPERLUX™ dispenser (from DISPERLUX S.A.R.L., Luxembourg). Stirring was continued for 30 minutes. The vessel was connected to a DYNO™-MILL ECM Pilot mill from the company Willy A. Bachofen (Switzerland), preloaded with VEEA and filled for 42% with 0.4 mm yttrium stabilized zirconia beads ("high wear resistant zirconia grinding media" from TOSOH Co.). The mixture was circulated over the mill at a flow rate of 8 ml/min and a rotation speed in the mill of about 15 m/s for a residence time of 25 minutes. During the complete milling procedure the content in the mill was cooled to keep the temperature below 40° C. After milling, the dispersion was discharged and filtered through a 1 μm Whatman™ filter. The resulting concentrated pigment dispersion CPY-1 according to Table 17 exhibited an average particle size of 156 nm and a viscosity of 168 mPa·s measured at 25° C. using a Haake™ Rotovisco at a shear rate of 10 s$^{-1}$.

TABLE 17

| Component | wt % |
|---|---|
| PY150 | 15.0 |
| DB162 | 15.0 |
| INHIB | 1.0 |
| VEEA | 69.0 |

Preparation of Concentrated Black Pigment Dispersion CPK-1

A 30 wt % solution of DB162 in VEEA was prepared. 1 wt % INHIB was added. 1.103 kg SB550 and 0.397 kg PB15:4 were added to a mixture of 1.95 kg VEEA, 2.5 kg of the DB162 solution and 50 g INHIB, while stirring with a DISPERLUX™ dispenser (from DISPERLUX S.A.R.L., Luxembourg). Stirring was continued for 30 minutes. The vessel was connected to a DYNO™-MILL ECM Pilot mill from the company Willy A. Bachofen (Switzerland), preloaded with 1.5 kg 2-(2"-vinyloxyethoxy)ethylacrylate and filled for 42% with 0.4 mm yttrium stabilized zirconia beads ("high wear resistant zirconia grinding media" from TOSOH Co.). The mixture was circulated over the mill for 3 hours 55 minutes at a flow rate of 1.5 l/min and a rotation speed in the mill of about 13 m/s. During the milling procedure, an additional 2.5 kg of the DB162 solution was added. During the complete milling procedure the content in the mill was cooled to keep the temperature below 40° C. After milling, the dispersion was discharged and filtered through a 1 μm Whatman™ filter. The resulting concentrated pigment dispersion CPK-1 according to Table 18 exhibited an average particle size of 105 nm and a viscosity of 87 mPa·s measured at 25° C. using a Haake™ Rotovisco at a shear rate of 10 s$^{-1}$.

TABLE 18

| Component | wt % |
|---|---|
| SB550 | 11 |
| PB15:4 | 4 |
| DB162 | 15 |
| INHIB | 1 |
| VEEA | 69 |

The above prepared concentrated pigment dispersions CPC-1, CPM-1, CPM-2, CPY-1 and CPK-1 were combined with the ink components according to Table 19 in order to prepare the radiation curable inkjet inks INK-C, INK-M, INK-Y and INK-K. The weight percentage (wt %) of each ink component is based on the total weight of the inkjet ink.

TABLE 19

| wt % of: | INK-C | INK-M | INK-Y | INK-K |
|---|---|---|---|---|
| CPC-1 | 16.0 | — | — | — |
| CPM-1 | — | 15.3 | — | 2.7 |
| CPM-2 | — | 3.1 | — | — |
| CPY-1 | — | — | 18.0 | — |
| CPK-1 | — | — | — | 14.2 |
| VEEA | 58.1 | 55.7 | 56.1 | 57.2 |
| KIPVEEA | 9.8 | 9.8 | 9.8 | 9.8 |
| AXANTH | 10.6 | 10.6 | 10.6 | 10.6 |
| IC819 | 2.5 | 2.5 | 2.5 | 2.5 |
| EHA | 1.0 | 1.0 | 1.0 | 1.0 |
| BHT | 1.0 | 1.0 | 1.0 | — |
| STAB UV10 | — | — | — | 1.0 |
| UV3510 | 1.0 | 1.0 | 1.0 | 1.0 |
| Viscosity (mPa · s) | 5.6 | 5.9 | 5.9 | 5.8 |
| Average Particle size (nm) | 113 | 160 | 169 | 119 |

The inks of the CMYK inkjet ink set of Table 19 were used to print colour images Print 1 to 4 with a built inkjet printer using KJ4A type print heads from Kyocera on a 50 μm thick PET film with a 5 μm styrene-butadiene-styrene coating for sealing. The colour images were a migration test image consisting of a mosaic pattern with squares of 4 by 4 mm. One third of the squares are "black", one third are "grey" and the remaining squares are "green". The ink load for each square of the mosaic pattern after ripping is given by Table 20.

TABLE 20

| Square | INK-C | INK-M | INK-Y | INK-K | Total |
|---|---|---|---|---|---|
| Black square | — | — | — | 6.19 | 6.19 |
| Gray square | 2.02 | 2.02 | 2.02 | 0.34 | 6.40 |
| Green square | 6.19 | — | 6.19 | 2.00 | 14.38 |

(mL ink/m²)

The "black" squares represent an ink load of 6.19 mL/m². The overall average ink load is 8.99 mL/m².

The inkjet printing was performed using one or more curing systems as shown in Table 22.

The pin curing treatment with Integration Technology UV LEDs emitting at 395 nm was performed at a distance of 3 mm and at a speed of 50 m/min. A UV LED was positioned directly after the print head used for each inkjet ink. The received dose by the pin cure treatment was measured using a EIT Powerpuck™ II serial #16506. The received doses are shown by Table 21.

TABLE 21

| Treatment | Dose (mJ/cm²) |
|---|---|
| Pin cure INK-C | 11 |
| Pin cure INK-M | 9 |
| Pin cure INK-Y | 11 |
| Pin cure INK-K | 12 |

The curing system of DPL (Danish Process Light) was equipped with iron doped mercury vapor D-bulbs (Alpha-Cure AC5548 bulbs) and was used by moving the prints on a belt underneath the iron doped mercury vapor D-bulbs at 2 passes at 50 m/min and 2 passes at 20 m/min.

The Fusion curing was performed by passing the prints twice under a Fusion DRSE-120 conveyer equipped with a Fusion VPS/1600 lamp (D-bulb) at a belt speed of 20 m/min and at full power of the lamp.

The dose received by the prints with a DPL curing and/or a Fusion curing treatment were measured using a EIT Powerpuck™ serial #8651.

TABLE 22

| Print | Pin curing | DPL curing | Fusion curing | Total dose received by the print |
|---|---|---|---|---|
| Print 1 | No | Yes | Yes | 3196 mJ/cm² |
| Print 2 | Yes | Yes | Yes | 3239 mJ/cm² |
| Print 3 | No | Yes | No | 801 mJ/cm² |
| Print 4 | Yes | Yes | No | 844 mJ/cm² |

Prior to analysis, several sheets of the samples were stacked and stored for 10 days at 45° C. with a weight of 60 kg on top to mimic set-off from the printed side to the food side as can be encountered in roll-to-roll printing or stacking of the printed matter. The sample in the middle of the stack was used for analysis. The cured prints Print 1 to Print 4 were then evaluated for migrateables.

None of the ingredients used in the concentrated colour pigment dispersants could be detected. The detected amount of the other ink components with which the concentrated colour pigment dispersions were mixed is shown in Table 23. The food limit is based on the migration thresholds and are listed in Annex 6 of the Swiss Ordinance 817.023.21.

TABLE 23

| Ink component | Food Limit | Print 1 | Print 2 | Print 3 | Print 4 |
|---|---|---|---|---|---|
| VEEA | <10 ppb | 0 | 0 | 9 | 0 |
| KIPVEEA | <10 ppb | 0 | 0 | 0 | 0 |
| AXANTH | <10 ppb | 0 | 0 | 0 | 0 |
| IC819 | <3.3 ppm | 0 | 0 | 12 | 106 |
| EHA | <5 ppm | 28 | 103 | 750 | 862 |
| BHT | <3 ppm | 68 | 371 | 881 | 1341 |
| STAB UV10 | <10 ppb | 0 | 0 | 0 | 0 |

(ppb detected in)

From Table 23, it should be clear that all the prints made with the CMYK inkjet ink set fulfilled the food migration limits required for low migration inks.

Example 2

This example illustrates the effect of variations in the ink composition

Preparation of Radiation Curable Inkjet Inks

A concentrated pigment dispersion CPC-2 was made in exactly the same way as the concentrated pigment dispersions CPC-2 of EXAMPLE 1 with the exception that the monomer VEEA was replaced by DPGDA. The concentrated pigment dispersion CPC-2 exhibited an average particle size of 100 nm and a viscosity of 250 mPa·s measured at 25° C. using a Haake™ Rotovisco at a shear rate of 10 s⁻¹

The concentrated pigment dispersions CPC-1 and CPC-2 were combined with the ink components according to Table 24 and Table 25 in order to prepare the radiation curable inkjet inks I-1 to I-6 and C-1 to C-6. The weight percentage (wt %) of each ink component is based on the total weight of the inkjet ink

TABLE 24

| wt % of | I-1 | I-2 | I-3 | I-4 | I-5 | I-6 |
|---|---|---|---|---|---|---|
| CPC-1 | 23.00 | 23.00 | 23.00 | 23.00 | 23.00 | 23.00 |
| CPC-2 | — | — | — | — | — | — |
| IC819 | 3.00 | 3.00 | 3.00 | 3.00 | 3.00 | 3.00 |
| TPO | — | — | — | — | — | — |
| AXANTH | 25.00 | 25.00 | — | — | 25.00 | — |
| TN-1b | — | — | — | — | — | 15.50 |
| Omnipol ™ TX | — | — | 5.00 | 5.00 | — | — |
| BP-1 | — | — | — | — | — | — |
| Omnipol ™ BP | — | — | — | — | — | — |
| Genopol ™ AB-1 | 3.00 | — | 3.00 | — | — | — |
| EHA | — | — | — | — | 3.00 | — |
| EPDPOL | — | 3.00 | — | 3.00 | — | — |
| EPD | — | — | — | — | — | — |
| VEEA | 37.97 | 37.97 | 57.97 | 37.97 | 37.97 | 50.47 |
| DPGDA | — | — | — | — | — | — |
| SR295 | 7.00 | 7.00 | 7.00 | 7.00 | 7.00 | 7.00 |
| BYK ™ 333 | 0.03 | 0.03 | 0.03 | 0.03 | 0.03 | 0.03 |
| INHIB | 1.00 | 1.00 | 1.00 | 1.00 | 1.00 | 1.00 |

TABLE 25

| wt % of | C-1 | C-2 | C-3 | C-4 | C-5 | C-6 |
|---|---|---|---|---|---|---|
| CPC-1 | 23.00 | 23.00 | 23.00 | 23.00 | 23.00 | — |
| CPC-2 | — | — | — | — | — | 23.00 |
| IC819 | 5.00 | — | 3.00 | 3.00 | 3.00 | 3.00 |
| TPO | — | 3.00 | — | — | — | — |
| AXANTH | 25.00 | 25.00 | — | — | 25.00 | — |

TABLE 25-continued

| wt % of | C-1 | C-2 | C-3 | C-4 | C-5 | C-6 |
|---|---|---|---|---|---|---|
| TN-1b | — | — | — | — | — | — |
| Omnipol ™ TX | — | — | — | — | — | 5.00 |
| BP-1 | — | — | 12.50 | — | — | — |
| Omnipol ™ BP | — | — | — | 5.00 | — | — |
| Genopol ™ AB-1 | 3.00 | 3.00 | 3.00 | 3.00 | — | 3.00 |
| EHA | — | — | — | — | — | — |
| EPDPOL | — | — | — | — | — | — |
| EPD | — | — | — | — | 3.00 | — |
| VEEA | 35.97 | 37.97 | 50.47 | 57.97 | 37.97 | — |
| DPGDA | — | — | — | — | — | 57.97 |
| SR295 | 7.00 | 7.00 | 7.00 | 7.00 | 7.00 | 7.00 |
| BYK ™ 333 | 0.03 | 0.03 | 0.03 | 0.03 | 0.03 | 0.03 |
| INHIB | 1.00 | 1.00 | 1.00 | 1.00 | 1.00 | 1.00 |

Evaluation and Results

The radiation curable inkjet inks I-1 to I-6 and C-1 to C-6 all exhibited a surface tension of less than 35 mN/m at 25° C.

The radiation curable inkjet inks -1 to I-6 and C-1 to C-6 were coated on a 50 μm thick PET film with a 5 μm styrene-butadiene-styrene coating for sealing using a bar coater and a 10 μm wired bar. For the migration analysis, all coated samples were cured using a Fusion DRSE-120 conveyer, equipped with a Fusion VPS/1600 lamp (D-bulb). The samples were passed under the lamp once at a belt speed of 20 m/min and at full power of the lamp.

The coated samples were evaluated for odor, viscosity at 25° C. and 45° C., LED curing speed, migrateables, and transport stability. Prior to migration analysis, several sheets of the samples were stacked and stored for 10 days at 45° C. with a weight of 60 kg on top to mimic set-off from the printed side to the food side as can be encountered in roll-to-roll printing or stacking of the printed matter. The sample in the middle of the stack was used for analysis. The results are shown in Table 26.

TABLE 26

| Inkjet Ink | Odor | Viscosity 25° C. | Viscosity 45° C. | Curing Speed | Migrateables | Transport Stability |
|---|---|---|---|---|---|---|
| I-1 | 1.4 | OK | 7.9 mPa·s | OK | OK | OK |
| I-2 | 1.8 | OK | 6.9 mPa·s | OK | OK | OK |
| I-3 | 1.4 | OK | 9.5 mPa·s | OK | OK | OK |
| I-4 | 1.1 | OK | 6.1 mPa·s | OK | OK | OK |
| I-5 | 1.8 | OK | 7.2 mPa·s | OK | OK | OK |
| I-6 | 2.3 | OK | 6.6 mPa·s | OK | OK | OK |
| C-1 | 1.6 | OK | 8.5 mPa·s | OK | OK | Not OK |
| C-2 | 1.4 | OK | 7.9 mPa·s | OK | Not OK | OK |
| C-3 | 3.0 | OK | 7.9 mPa·s | Not OK | Not OK | OK |
| C-4 | 1.4 | OK | 6.3 mPa·s | Not OK | Not OK | OK |
| C-5 | 2.4 | OK | 7.1 mPa·s | OK | Not OK | OK |
| C-6 | 2.5 | OK | 12.5 mPa·s | OK | Not OK | OK |

From Table 26, it should be clear that the radiation curable inkjet inks I-1 to I-6 exhibited a good curing speed with UV LEDs while still complying with the food safety requirements for migrateables, while also the performance of the radiation curable inkjet inks I-1 to I-6 did not suffer under the variations in high and low temperatures, unlike the radiation curable inkjet ink C-1. The radiation curable inkjet inks I-1 to I-6 also exhibited an acceptable odor after LED curing, with the radiation curable inkjet ink I-6 showing that preferably a separate tertiary amine co-initiator is present in the inkjet ink. The radiation curable inkjet inks I-2 and I-3 to I-6 comply with the requirements for the plurality of inkjet inks of claim 1.

The invention claimed is:

1. A radiation curable inkjet ink set comprising:
   a plurality of inkjet inks each having a viscosity of no more than 50 mPa·s at 25° C. and a shear rate of 90 s$^{-1}$, all of the plurality of inkjet inks in the radiation curable inkjet ink set including:
   at least one non-polymerizable, non-polymeric bisacylphosphine oxide present in a concentration of no more than 4.0 wt % based on a total weight of the inkjet ink;
   at least one monomer including at least one vinyl ether group and at least one polymerizable group selected from the group consisting of an acrylate group and a methacrylate group; and
   at least one polymerizable or polymeric thioxanthone, wherein if the at least one polymerizable or polymeric thioxanthone contains no tertiary amine group, then the radiation curable inkjet ink further includes at least one tertiary amine co-initiator selected from the group consisting of ethylhexyl-4-dimethylaminobenzoate and a polymerizable co-initiator containing a tertiary amine; wherein
   when the at least one polymerizable or polymeric thioxanthone is a polymerizable thioxanthone, the at least one polymerizable thioxanthone is selected from the group consisting of:

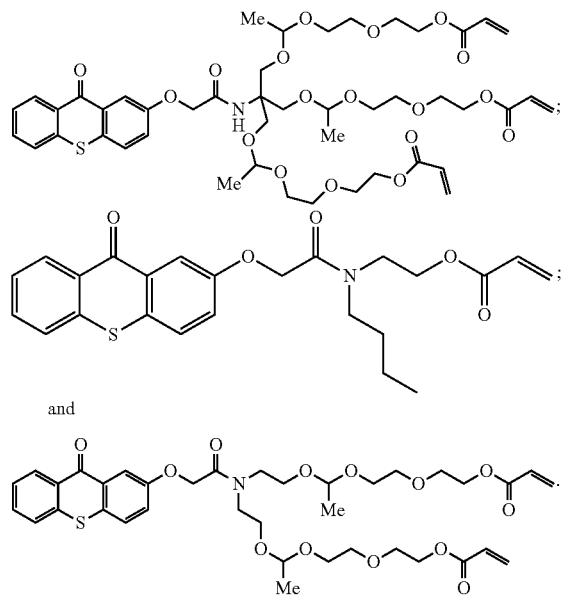

and

2. The radiation curable inkjet ink set according to claim 1, wherein the at least one polymerizable or polymeric thioxanthone is present in an amount of at least 2 wt % based on the total weight of the inkjet ink.

3. The radiation curable inkjet ink set according to claim 1, wherein the at least one non-polymerizable, non-polymeric bisacylphosphine oxide is selected from the group consisting of bis(2,4,6-trimethylbenzoyl)phenylphosphine oxide and bis(2,6-dimethoxybenzoyl)(2,4,4-trimethylpentyl)phosphine oxide.

4. The radiation curable inkjet ink set according to claim 1, wherein the at least one polymerizable co-initiator containing a tertiary amine includes one or more 4-dialkylaminobenzoate groups.

5. The radiation curable inkjet ink set according to claim 1, wherein, when the at least one polymerizable or polymeric thioxanthone is a polymeric thioxanthone, the at least one polymeric thioxanthone is selected from the group consisting of:

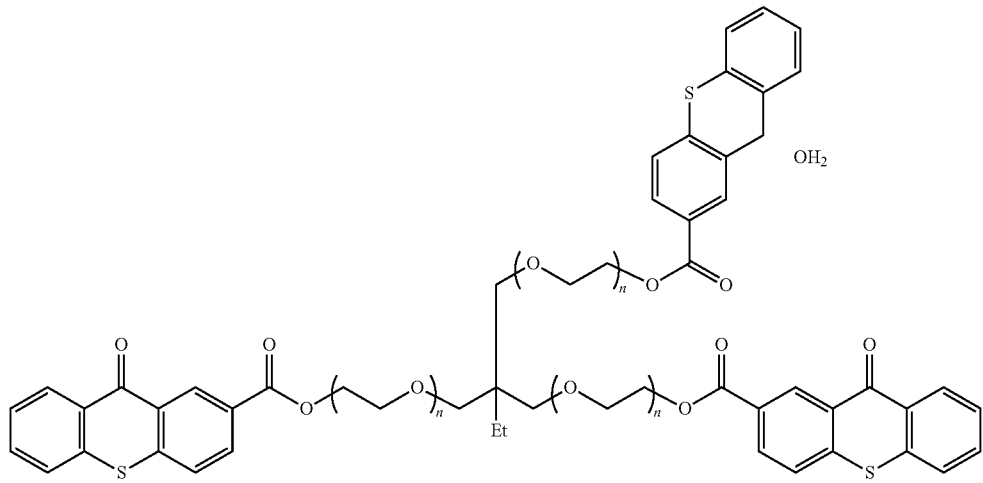

wherein n on average is equal to 2 to 4; and with a molecular weight Mw smaller than 1,000.

6. The radiation curable inkjet ink set according to claim 1, wherein the at least one monomer is selected from the group consisting of:

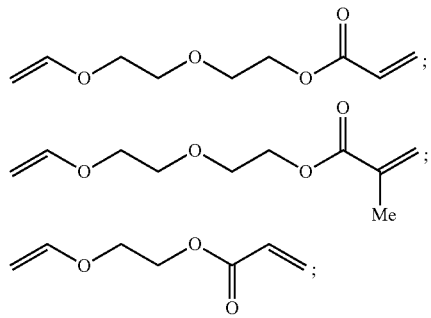

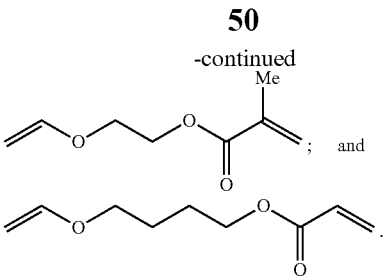

7. The radiation curable inkjet ink set according to claim 1, wherein each of the plurality of inkjet inks includes at least one monomer selected from the group consisting of N-vinyl caprolactam, phenoxyethyl acrylate, dipropyleneglycoldiacrylate, ethoxylated trimethylolpropane triacrylate, pentaerythritol tetraacrylate, and cyclic trimethylolpropane formal acrylate.

8. The radiation curable inkjet ink set according to claim 1, wherein each of the plurality of inkjet inks includes a polymerizable composition consisting essentially of:
a) 25 to 100 wt % of 2-(2-vinyloxyethoxy)ethyl acrylate;
b) 0 to 55 wt % of one or more polymerizable compounds A selected from the group consisting of monofunctional acrylates and difunctional acrylates; and
c) 0 to 55 wt % of one or more polymerizable compounds B selected from the group consisting of trifunctional acrylates, tetrafunctional acrylates, pentafunctional acrylates, and hexafunctional acrylates, wherein if a weight percentage of compounds A >24 wt %, then a weight percentage of compounds B >1 wt %; wherein all weight percentages of A and B are based upon a total weight of the polymerizable composition.

9. A method of preparing a radiation curable inkjet ink set including a plurality of inkjet inks each having a viscosity of no more than 50 mPa·s at 25° C. and a shear rate of 90 s$^{-1}$, the method comprising the step of:

mixing a plurality of inkjet inks, all of the plurality of inkjet inks in the radiation curable inkjet ink set including:

at least one non-polymerizable, non-polymeric bisacylphosphine oxide;

at least one monomer including at least one vinyl ether group and at least one polymerizable group selected from the group consisting of an acrylate group and a methacrylate group; and at least one polymerizable or polymeric thioxanthone, wherein if the at least one polymerizable or polymeric thioxanthone contains no tertiary amine group, then the radiation curable inkjet ink further includes at least one tertiary amine co-initiator selected from the group consisting of ethylhexyl-4-dimethylaminobenzoate and a polymerizable co-initiator containing a tertiary amine; wherein the at least one non-polymerizable, non-polymeric bisacylphosphine oxide is present in a concentration of no more than 4 wt % based on a total weight of the radiation curable inkjet ink; and when the at least one polymerizable or polymeric thioxanthone is a polymerizable thioxanthone, the at least one polymerizable thioxanthone is selected from the group consisting of:

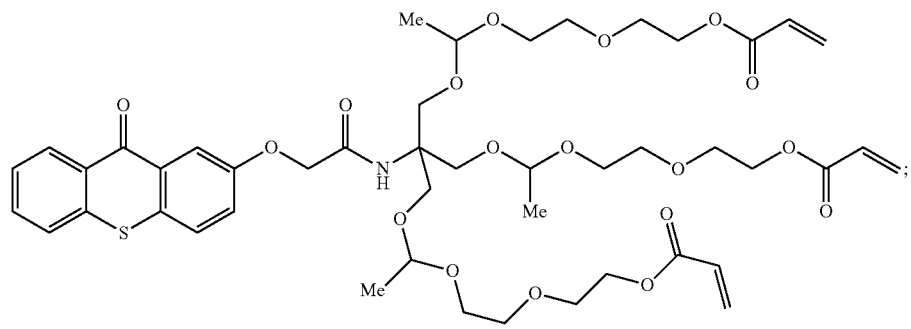

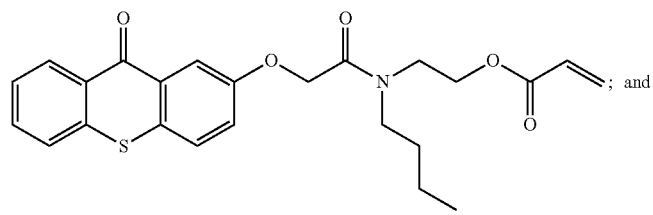

; and

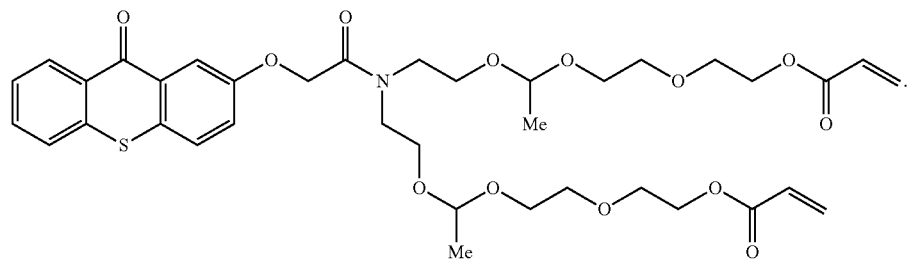

10. A method of printing on a substrate comprising the steps of:
   providing a radiation curable inkjet ink set as defined by claim 1 to an inkjet printing device; and
   inkjet printing an image on the substrate with the inkjet printing device.

11. The method of printing on a substrate according to claim 10, wherein the substrate is selected from the group consisting of polyethylene, polypropylene, polycarbonate, polyvinyl chloride, polyethylene terephthalate (PET), polyethylene naphthalate (PEN), polylactide (PLA), polyimide, and resin coated paper.

12. The method of printing on a substrate according to claim 10, wherein the substrate is packaging.

13. The method of printing on a substrate to claim 12, wherein the packaging is food packaging.

14. The method of printing on a substrate according to claim 10, wherein the image is at least partially cured using one or more UV LEDs.

* * * * *